US012547098B2

(12) United States Patent
Sugimoto et al.

(10) Patent No.: US 12,547,098 B2
(45) Date of Patent: Feb. 10, 2026

(54) TONER CONTAINER AND IMAGE FORMING SYSTEM

(71) Applicant: CANON KABUSHIKI KAISHA, Tokyo (JP)

(72) Inventors: Sohta Sugimoto, Kanagawa (JP); Shinichi Nishida, Kanagawa (JP); Hiroyuki Munetsugu, Kanagawa (JP); Goshi Ozaki, Kanagawa (JP); Mitsuhiro Sato, Tokyo (JP); Masahiro Suetsugu, Kanagawa (JP); Seiya Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/828,503

(22) Filed: Sep. 9, 2024

(65) Prior Publication Data

US 2025/0085650 A1 Mar. 13, 2025

(30) Foreign Application Priority Data

Sep. 11, 2023 (JP) ................................ 2023-146697

(51) Int. Cl.
*G03G 15/08* (2006.01)

(52) U.S. Cl.
CPC ..... *G03G 15/0874* (2013.01); *G03G 15/0863* (2013.01); *G03G 15/0886* (2013.01)

(58) Field of Classification Search
CPC .......... G03G 15/0863; G03G 15/0874; G03G 15/0886
USPC ........................................ 399/252, 258, 260
See application file for complete search history.

(56) References Cited

U.S. PATENT DOCUMENTS 9,423,720 B2 * 8/2016 Hosokawa ......... G03G 15/0872
9,465,317 B2 * 10/2016 Kikuchi ............ G03G 15/0877

FOREIGN PATENT DOCUMENTS

| | | |
|---|---|---|
| JP | 2003107977 A | 4/2003 |
| JP | 2007114667 A | 5/2007 |
| JP | 2013097316 A | 5/2013 |
| JP | 2021026202 A | 2/2021 |
| JP | 2021056433 A | 4/2021 |

* cited by examiner

*Primary Examiner* — Hoan H Tran
(74) *Attorney, Agent, or Firm* — Canon U.S.A., Inc. IP Division

(57) ABSTRACT

A toner container includes a bag, including an opening and formed of resin film, stores toner and a leading edge portion mounted on the opening of the bag, the leading edge portion including a nozzle provided with a discharge port to discharge the toner stored in the bag external to the toner container, wherein the leading edge portion includes a portion formed of resin and provided with a two-dimensional code, and wherein the portion has a thickness greater than a thickness of the film.

24 Claims, 22 Drawing Sheets

TONER CONTAINER AND IMAGE FORMING SYSTEM

BACKGROUND

Field

The present disclosure relates to a toner container and an image forming system.

Description of the Related Art

In an electrophotographic image forming apparatus, an electrostatic latent image formed on an image carrying member, such as a photosensitive drum, is developed using toner as a developer and the image is visualized in the form of a toner image. As a method for replenishing toner consumed by development, a method of replenishing toner by transferring only toner into an image forming apparatus through a replenishment port formed in the image forming apparatus is known. If there is a need to replenish toner, a user attaches a toner container separate from the image forming apparatus to the replenishment port and transfers only toner contained in the toner container into the image forming apparatus to thereby replenish toner. Patent Literature 1 discusses a toner container including a bag body (pouch) formed of a flexible film, and a base having a supply opening to be connected to a replenishment port of an image forming apparatus and used to discharge toner contained in the pouch.

SUMMARY

According to an aspect of the present disclosure, a toner container includes a bag, including an opening and formed of resin film, configured to store toner, and a leading edge portion mounted on the opening of the bag, the leading edge portion including a nozzle provided with a discharge port to discharge the toner stored in the bag external to the toner container, wherein the leading edge portion includes a portion formed of resin and provided with a two-dimensional code, and wherein the portion has a thickness greater than a thickness of the film.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

Overall Configuration

Figure 2A:
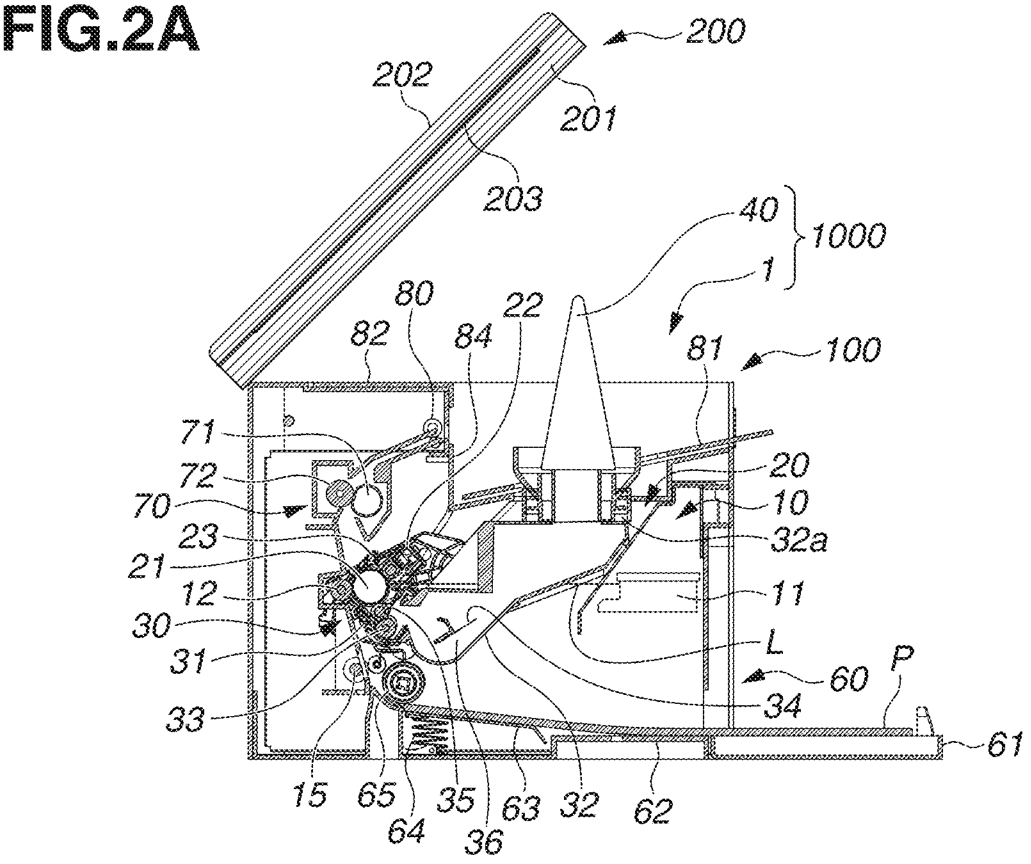
FIG. 2A is a sectional view of an image forming apparatus according to the first exemplary embodiment.
Figure 2B:
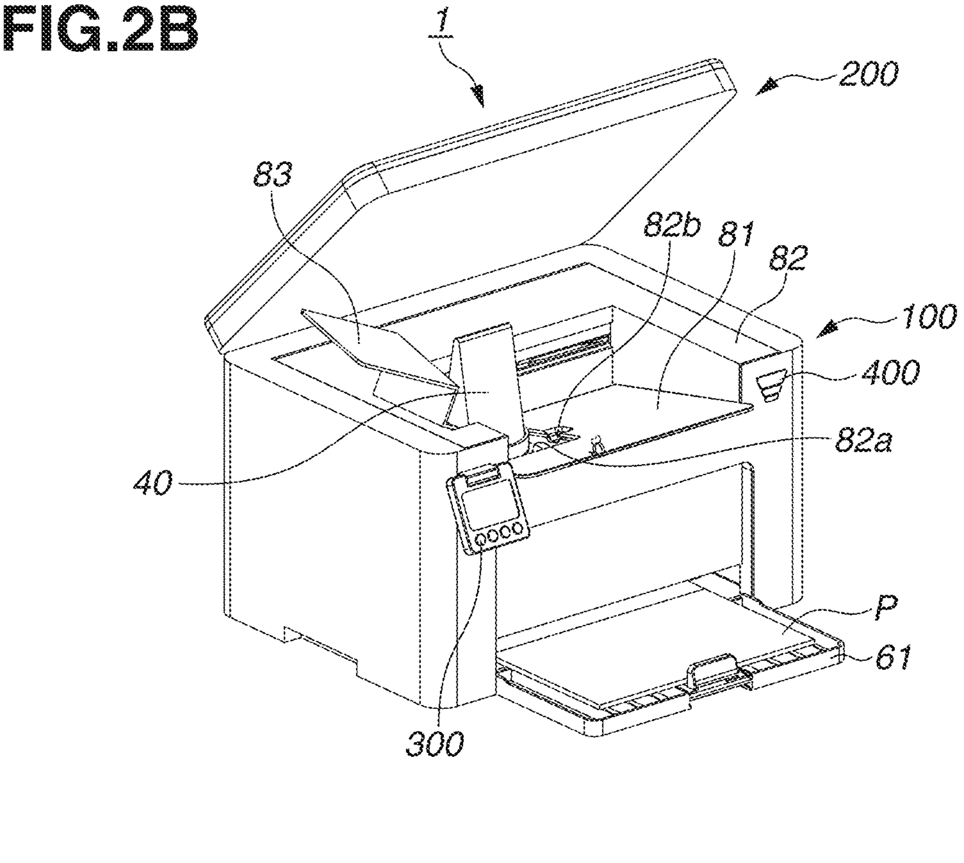
FIG. 2B is a perspective view of the image forming apparatus.
Figure 3:
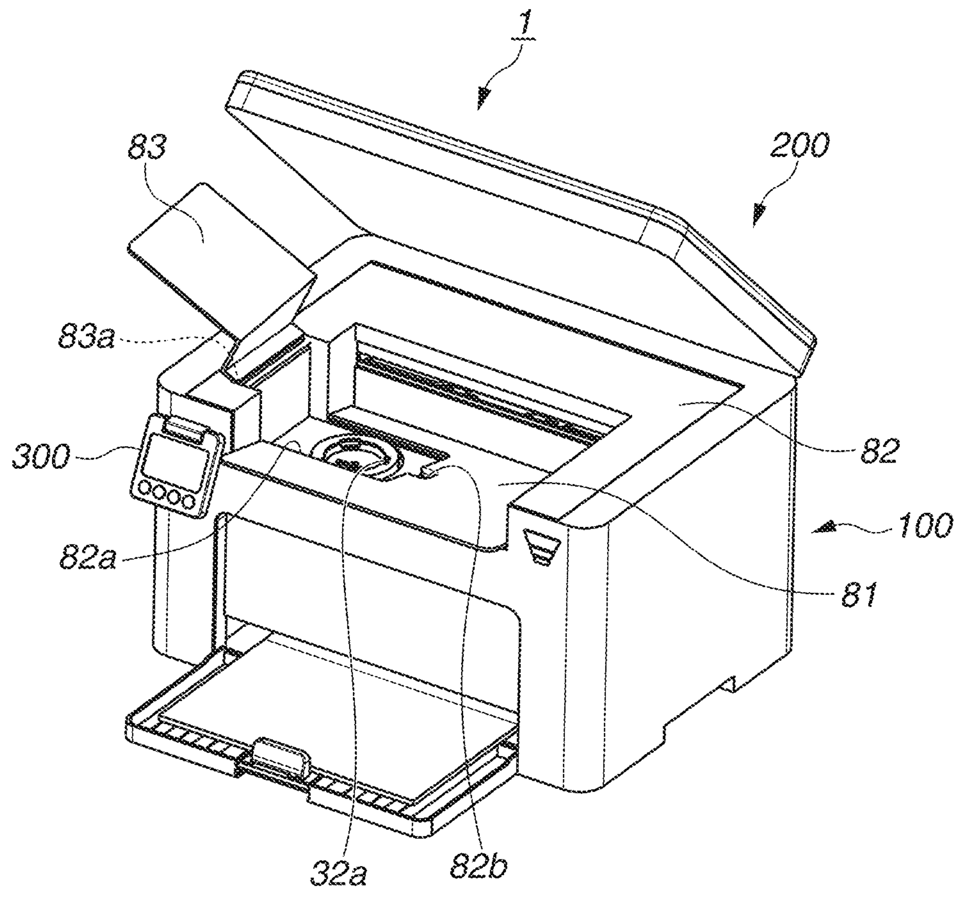
FIG. 3 is a perspective view illustrating the image forming apparatus according to the first exemplary embodiment.

FIG. 2A is a sectional view illustrating a configuration example of an image forming apparatus 1 according to a first exemplary embodiment of the present disclosure. FIGS. 2B and 3 are perspective views of the image forming apparatus 1. The image forming apparatus 1 is a monochrome printer that forms an image on a recording material based on image information input from an external apparatus. Examples of the recording material include various types of sheet materials made of different materials, respectively, including paper such as plain paper and cardboard, a plastic film such as an overhead projector sheet, a sheet with a special form such as an envelope and index paper, and cloth.

As illustrated in FIGS. 2A and 2B, the image forming apparatus 1 includes a printer body 100 as a main body of the image forming apparatus 1, a scanning device 200 that is supported by the printer body 100 in an openable or closable manner, and an operation unit 300 that is mounted on an exterior surface of the printer body 100. The printer body 100 includes an image forming unit 10 that forms a toner image on a recording material, a feed unit 60 that feeds the recording material to the image forming unit 10, a fixing unit 70 that fixes the toner image formed by the image forming unit 10 onto the recording material, and a discharge roller pair 80.

The image forming unit 10 includes a scanner unit 11, an electrophotographic process unit 20, and a transfer roller 12 that transfers the toner image formed on the surface of a photosensitive drum 21 of the process unit 20 onto the recording material. The process unit 20 includes the photosensitive drum 21, a charging roller 22 that is located around the photosensitive drum 21, a pre-exposure device 23, and a developing device 30 including a developing roller 31.

The photosensitive drum 21 is an image carrying member that carries an electrostatic image and a toner image (developer image). The photosensitive drum 21 is a cylindrically formed photosensitive member. The photosensitive drum 21 according to the present exemplary embodiment includes a photosensitive layer formed of a negatively-charged organic photoreceptor on a drum-shaped base formed of aluminum. The photosensitive drum 21 is driven by a motor to rotate in a predetermined direction (clockwise in FIG. 2A) at a predetermined process speed.

The charging roller 22 is brought into contact with the photosensitive drum 21 with a predetermined pressure contact force and forms a charging portion. The charging roller 22 uniformly charges the surface of the photosensitive drum 21 at a predetermined potential when a desired charging voltage is applied by a charging high-voltage power supply. According to the present exemplary embodiment, the photosensitive drum 21 is charged to a negative polarity by the charging roller 22. The pre-exposure device 23 eliminates the surface potential of the photosensitive drum 21 before the photosensitive drum 21 enters the charging portion in order to cause stable electrical discharge in the charging portion.

The scanner unit 11 serving as an exposure unit scans and exposes the surface of the photosensitive drum 21 by irradiating the photosensitive drum 21 with laser light corresponding to image information input from an external apparatus or the scanning device 200 using a polygon mirror. This exposure operation forms an electrostatic latent image on the surface of the photosensitive drum 21 based on the image information. The scanner unit 11 is not limited to a laser scanner device. For example, a light-emitting diode (LED) exposure device that includes an LED array including a plurality of LEDs arranged along a longitudinal direction of the photosensitive drum 21 can be employed.

The developing device 30 includes the developing roller 31 serving as a developer carrying member that carries a developer, a developing container 32 serving as a frame of the developing device 30, and a supply roller 33 configured to supply the developer to the developing roller 31. The developing roller 31 and the supply roller 33 are rotatably supported by the developing container 32. The developing roller 31 is located at an opening of the developing container 32 such that the developing roller 31 faces the photosensitive drum 21. The supply roller 33 is in rotatable contact with the developing roller 31, and toner serving as a developer contained in the developing container 32 is applied to the surface of the developing roller 31 by the supply roller 33. The supply roller 33 is not necessarily needed if a configuration capable of supplying sufficient toner to the developing roller 31 is employed.

The developing device 30 according to the present exemplary embodiment uses a contact development method as the development method. Specifically, a toner layer carried on the developing roller 31 is brought into contact with the photosensitive drum 21 in a developing portion (developing area) where the photosensitive drum 21 and the developing roller 31 face each other. A developing voltage is applied to the developing roller 31 by a developing high-voltage power supply. Under the developing voltage, the toner carried on the developing roller 31 is transferred from the developing roller 31 to the surface of the photosensitive drum 21 according to a potential distribution on the surface of the photosensitive drum 21, thereby developing the electrostatic latent image into a toner image. According to the present exemplary embodiment, a reversal development method is employed. Specifically, after the surface of the photosensitive drum 21 is charged in a charging process, toner is deposited on the surface region of the photosensitive drum 21 where the amount of charge is decreased due to the exposure in an exposure process, thereby forming a toner image.

According to the present exemplary embodiment, powder toner having a negative normal charge polarity is used. More specifically, according to the present exemplary embodiment, the particle size of the powder toner is in a range from 2 μm to 15 μm. The angle of repose of the toner is in a range from 50° to 80°. An example of the particle size of the toner is 6 μm, and an example of the angle of repose of the toner is 62°. The toner according to the present exemplary embodiment is, for example, a polymerized toner produced by a polymerization method. The toner according to the present exemplary embodiment does not contain a magnetic component and is a non-magnetic one-component developer to be carried on the developing roller 31 mainly by an intermolecular force and an electrostatic force (mirror image force). Alternatively, a one-component developer containing a magnetic component can be used. The one-component developer can contain additives (e.g., wax or silica particles) in addition to toner particles to adjust the fluidity and charging performance of the toner. More alternatively, a two-component developer composed of a non-magnetic toner and a magnetic carrier can be used as the developer. In the case of using a magnetic developer, for example, a cylindrical developing sleeve having a magnet formed therein is used as the developer carrying member.

The developing container 32 includes a storage portion 36 serving as a second toner storage portion for storing toner, and an agitating member 34 serving as an agitating unit located inside the storage portion 36. The agitating member 34 is driven to rotate by a motor (not illustrated), thereby agitating the toner in the developing container 32 and feeding the toner toward the developing roller 31 and the supply roller 33. The agitating member 34 also has a function to cause the toner that is not used for development and is scraped off from the developing roller 31 to circulate in the developing container 32, thereby uniformizing the toner in the developing container 32. The agitating member 34 is not limited to a rotating agitating member. For example, a swinging agitating member can be employed.

At the opening of the developing container 32 where the developing roller 31 is located, a developing blade 35 for regulating the amount of toner carried on the developing roller 31 is located. The toner supplied to the surface of the developing roller 31 is formed into a uniform thin layer and is charged to a negative polarity by triboelectric charging as the toner passes through an opposed portion that faces the developing blade 35 in accordance with the rotation of the developing roller 31.

As illustrated in FIGS. 2A and 2B, the feed unit 60 includes a front door 61 that is supported by the printer body 100 in an openable or closable manner, a tray unit 62, an intermediate plate 63, a tray spring 64, and a pickup roller 65. The tray unit 62 constitutes a bottom surface of a recording material storage space that appears when the front door 61 is open, and the intermediate plate 63 is supported by the tray unit 62 such that the intermediate plate 63 can ascend or descend. The tray spring 64 urges the intermediate plate 63 upward and presses a recording material P stacked on the intermediate plate 63 against the pickup roller 65. The front door 61 closes the recording material storage space in a state where the front door 61 is closed with respect to the printer body 100, and supports the recording material P together with the tray unit 62 and the intermediate plate 63 in a state where the front door 61 is open with respect to the printer body 100.

The fixing unit 70 is a fixing unit of a heat fixing type that performs an image fixing process by heating and melting the toner on the recording material P. The fixing unit 70 includes a fixing film 71, a fixing heater such as a ceramic heater that heats the fixing film 71, a thermistor that measures the temperature of the fixing heater, and a pressure roller 72 that is in pressure contact with the fixing film 71.

Next, an image forming operation to be performed by the image forming apparatus 1 will be described. When an image forming instruction (print job) is input to the image forming apparatus 1, an image forming process to be performed by the image forming unit 10 is started based on image information input from an external computer or the scanning device 200 connected to the image forming apparatus 1. The scanner unit 11 irradiates the photosensitive drum 21 with laser light based on the input image information. In this case, the photosensitive drum 21 is preliminarily charged by the charging roller 22, and an electrostatic latent image is formed on the photosensitive drum 21 by the irradiation of laser light. After that, the electrostatic latent image is developed by the developing roller 31, and a toner image is formed on the photosensitive drum 21.

In parallel with the image forming process described above, the pickup roller 65 of the feed unit 60 delivers the recording material P supported by the front door 61, the tray unit 62, and the intermediate plate 63. The recording material P is fed by the pickup roller 65 to a registration roller pair 15. The recording material P hits a nip of the registration roller pair 15, thereby correcting a skew of the recording material P. Then, the registration roller pair 15 is driven in synchronization with a toner image transfer timing and conveys the recording material P toward a transfer nip formed by the transfer roller 12 and photosensitive drum 21.

A transfer voltage is applied from a transfer high-voltage power supply to the transfer roller 12 serving as a transfer unit, and the toner image carried on the photosensitive drum 21 is transferred onto the recording material P conveyed by the registration roller pair 15. The recording material P having the toner image transferred thereonto is conveyed to the fixing unit 70. When the toner image passes through a nip portion formed by the fixing film 71 and the pressure roller 72 of the fixing unit 70, the toner image is heated and pressurized. This causes the toner particles to melt and then solidify, which fixes the toner image onto the recording material P. The recording material P that has passed through the fixing unit 70 is discharged to the outside of the image forming apparatus 1 by the discharge roller pair 80 serving as a discharge unit, and is stacked on a discharge tray 81 serving as a stacking unit provided at an upper portion of the printer body 100.

The discharge tray 81 is sloped upward toward the downstream side in a recording material discharge direction, and the trailing edges of the recording materials P discharged onto the discharge tray 81 are aligned by a regulating surface 84 when the recording materials P slide down the discharge tray 81. FIGS. 2A and 2B and FIG. 3 illustrate a state where an opening/closing member 83 to be described below is open. However, assume that the opening/closing member 83 is closed in advance when the image forming operation is performed.

The scanning device 200 includes a scanning unit 201 having a scanning portion (not illustrated) incorporated therein and a pressure plate 202 that is supported by the scanning unit 201 in an openable or closable manner. A document platen glass 203 on which a document is to be placed is provided on the upper surface of the scanning unit 201. The document platen glass 203 allows light emitted from the scanning portion to pass therethrough.

In the case of causing an image on a document to be scanned by the scanning device 200, a user places the document on the document platen glass 203 in a state where the pressure plate 202 is open. The user closes the pressure plate 202, to thereby prevent misalignment of the document on the document platen glass 203. For example, the user operates the operation unit 300 to output a scan instruction to the image forming apparatus 1. When a scanning operation is started, the scanning portion in the scanning unit 201 moves back and forth in a sub-scanning direction, that is, the scanning portion moves back and forth in the right-left direction in a state where the operation unit 300 of the image forming apparatus 1 faces the front side. The scanning portion emits light from a light emitting unit to the document, receives light reflected by the document using a light receiving unit, and photoelectrically converts the light, thereby making it possible to scan the image of the document. In the following description, the front-back direction, the left-right direction, and the up-down direction are defined based on the state where the operation unit 300 faces the front side.

A top cover 82 serving as a stacking tray is provided at an upper portion of the printer body 100, and the discharge tray 81 serving as a stacking surface is formed on the upper surface of the top cover 82.

As illustrated in FIGS. 2B and 3, the opening/closing member 83 is supported by the top cover 82 in an openable or closable manner about a rotation shaft 83*a* extending in the front-back direction. The discharge tray 81 of the top cover 82 is provided with an opening 82*a* that is opened upward.

The opening/closing member 83 is configured to be movable between a closed position and an open position. In the closed position, a replenishment port 32*a* is covered so that a toner pack 40 cannot be attached to the developing container 32. In the open position, the replenishment port 32*a* is exposed so that the toner pack 40 can be mounted on the developing container 32. In the closed position, the opening/closing member 83 functions as a part of the discharge tray 81. The opening/closing member 83 and the opening 82*a* are formed on the left side of the discharge tray 81. The opening/closing member 83 is opened to the left by hanging a finger from a groove 82*b* formed in the top cover 82. The opening/closing member 83 is formed in a substantially L-shape along the shape of the top cover 82.

The opening 82*a* of the discharge tray 81 is open so that the replenishment port 32*a* for toner replenishment formed at the upper portion of the developing container 32 is exposed. When the opening/closing member 83 is open, the user can access the replenishment port 32*a*. According to the present exemplary embodiment, the method (direct replenishment method) in which the user replenishes toner in the developing device 30 from the toner pack 40 (see FIGS. 2A and 2B) filled with toner for replenishment in a state where the developing device 30 is mounted on the image forming apparatus 1 is employed. The toner pack 40 is at least partially exposed to the outside of the image forming apparatus 1 in a state where the toner pack 40 is mounted on the image forming apparatus 1.

This configuration eliminates the need for the operation of removing the process unit 20 from the printer body 100 and replacing the process unit 20 with a new process unit when the remaining amount of toner in the process unit 20 is small. This leads to an improvement in usability. In addition, the developing container 32 can be replenished with toner at a lower cost than in the case of replacing the process unit 20 with a new process unit. The direct replenishment method also reduces costs as compared with a method for replacing only the developing device 30 of the process unit 20, because there is no need to replace a variety of rollers, gears, and the like.

The image forming apparatus 1 having the replenishment port that can be exposed to the outside and the toner pack 40 that is detachably mounted on the image forming apparatus 1 to replenish toner in the image forming apparatus 1 via the replenishment port constitute an image forming system 1000. The toner pack 40 illustrated in FIGS. 2A and 2B and FIG. 3 is a reference example and differs in shape from a toner pack 600 to be described below.

Configuration of Toner Pack

A toner (developer) replenishing system for the image forming apparatus 1 according to the present exemplary embodiment will be described below.

First, a basic configuration of the toner pack 600 that is detachably mounted on the image forming apparatus 1 serving as the apparatus body and stores toner will be described with reference to FIGS. 4A to 7B. The toner pack 600 serving as a toner container is configured to be mounted on a mounting unit 500 (described below) provided in the image forming apparatus 1.

Figure 4A:
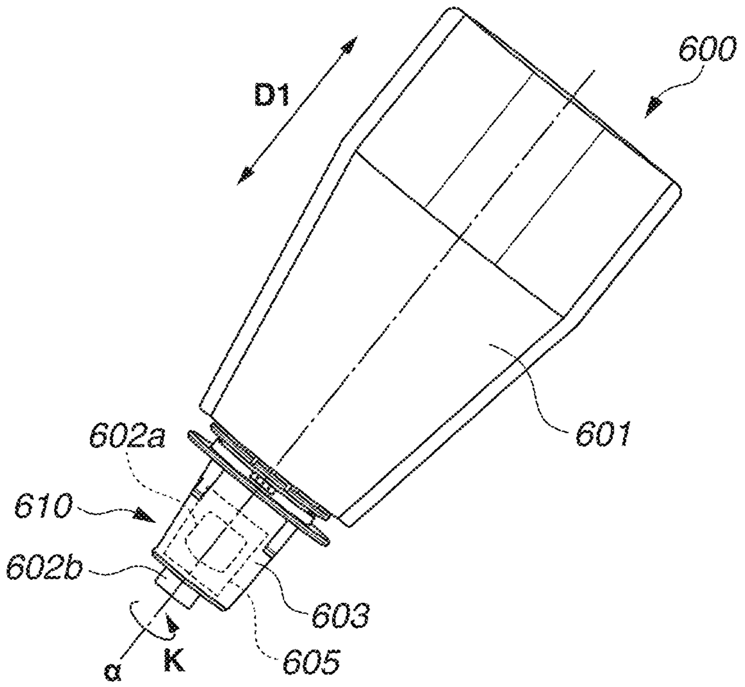
FIGS. 4A and 4B are perspective views each illustrating a toner pack according to the first exemplary embodiment.
Figure 4B:
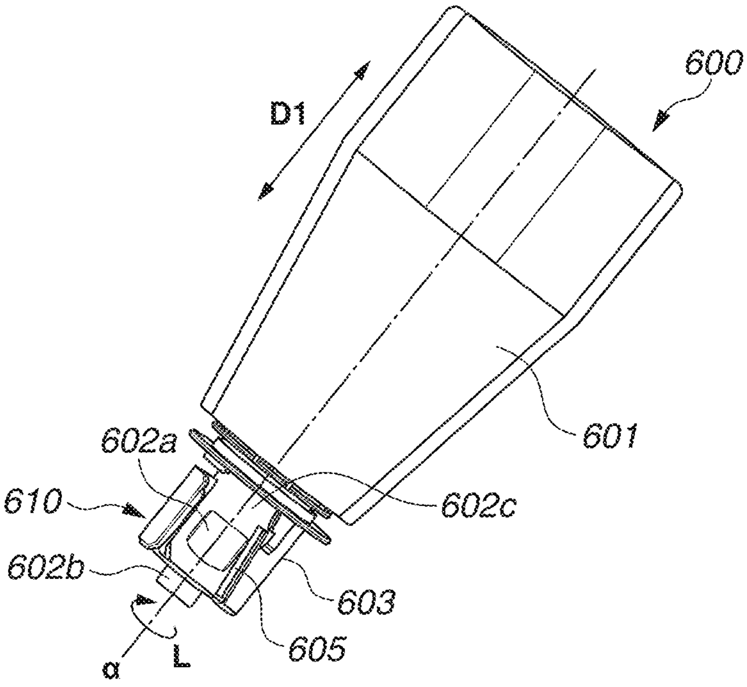
Figure 5:
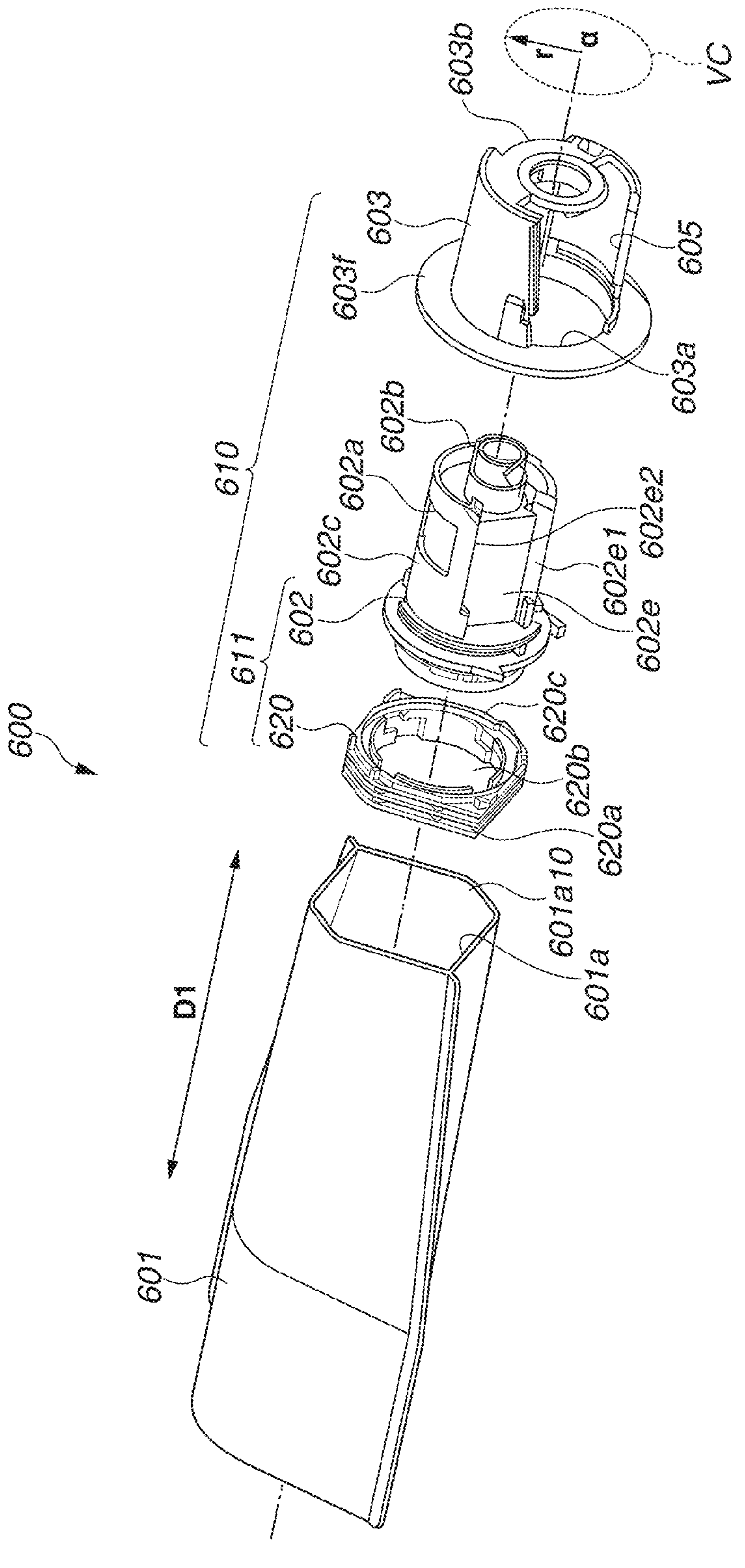
FIG. 5 is an exploded view of the toner pack according to the first exemplary embodiment.
Figure 6B:
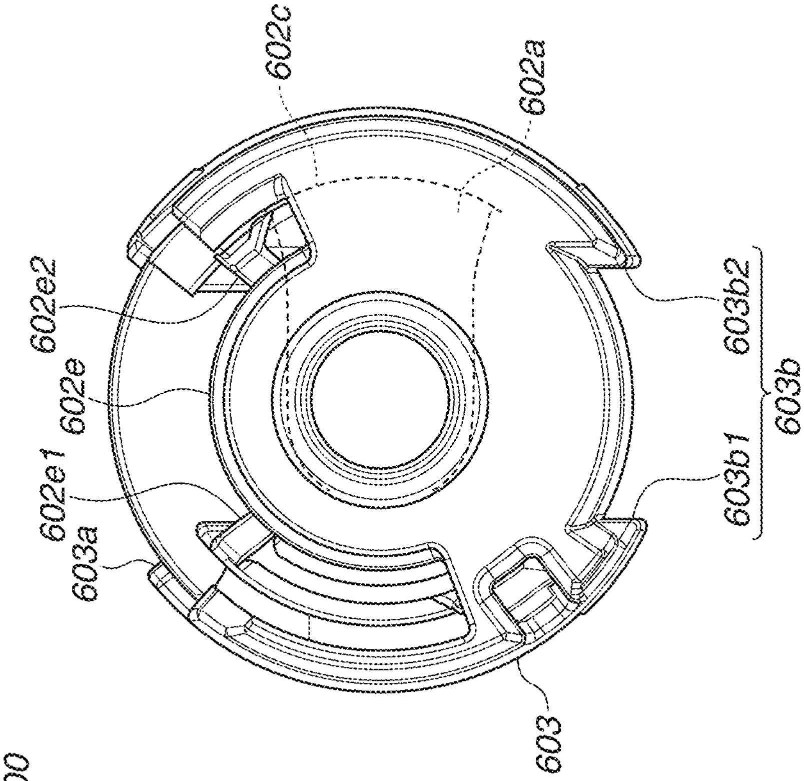
FIG. 6B is a bottom view of the nozzle.
Figure 6A:
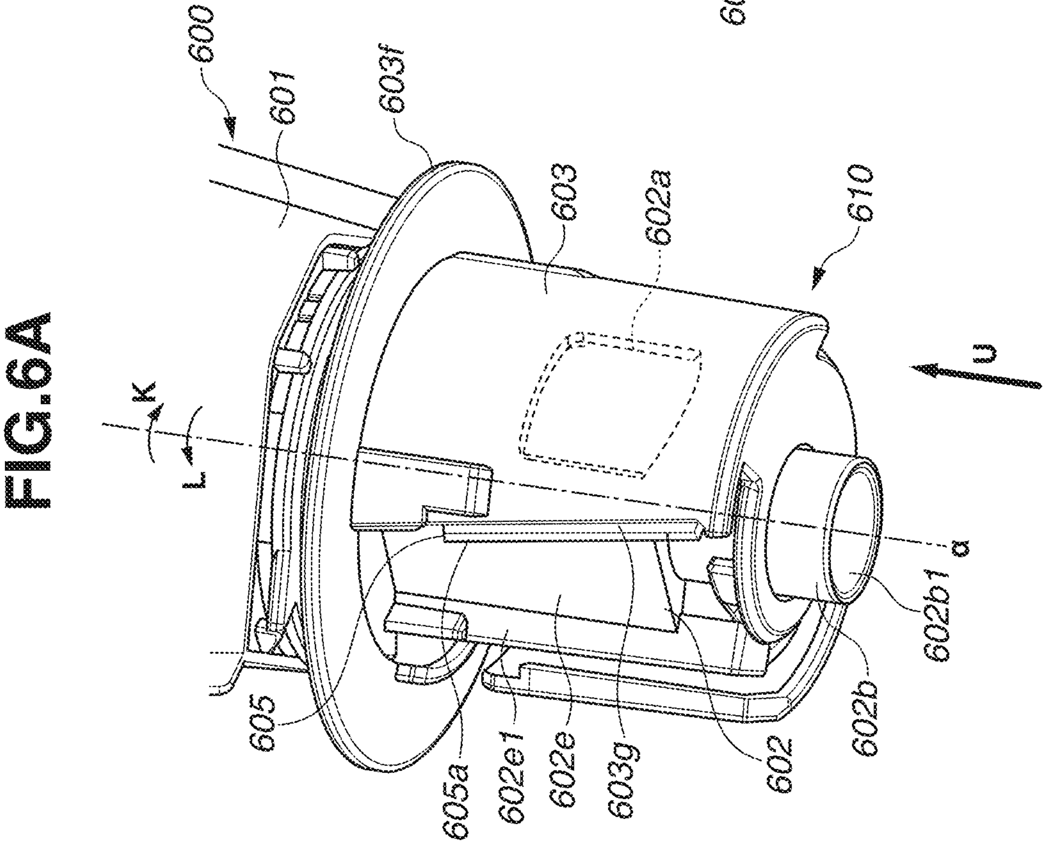
FIG. 6A is a perspective view illustrating a nozzle of the toner pack according to the first exemplary embodiment.
Figure 7B:
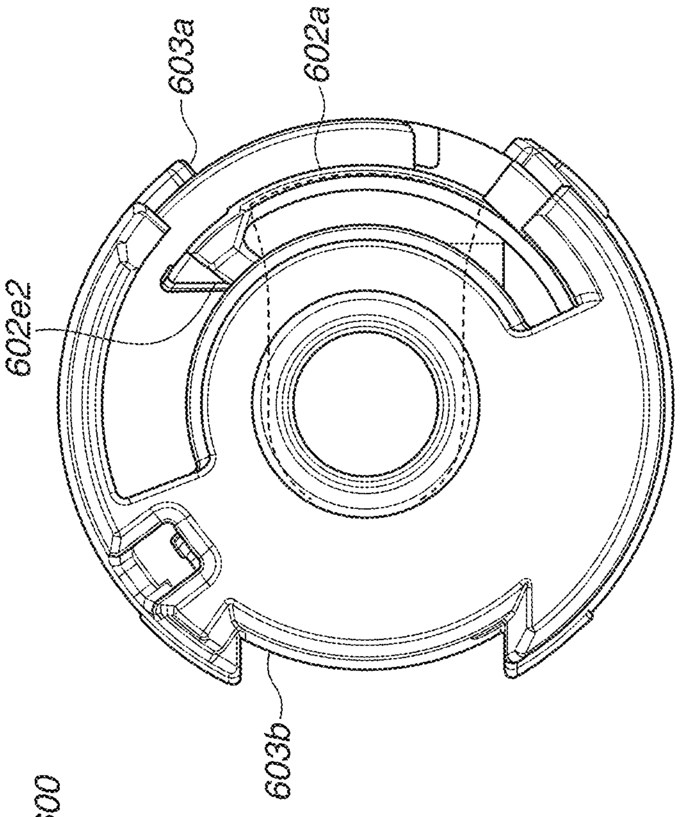
FIG. 7B is a bottom view of the nozzle.
Figure 7A:
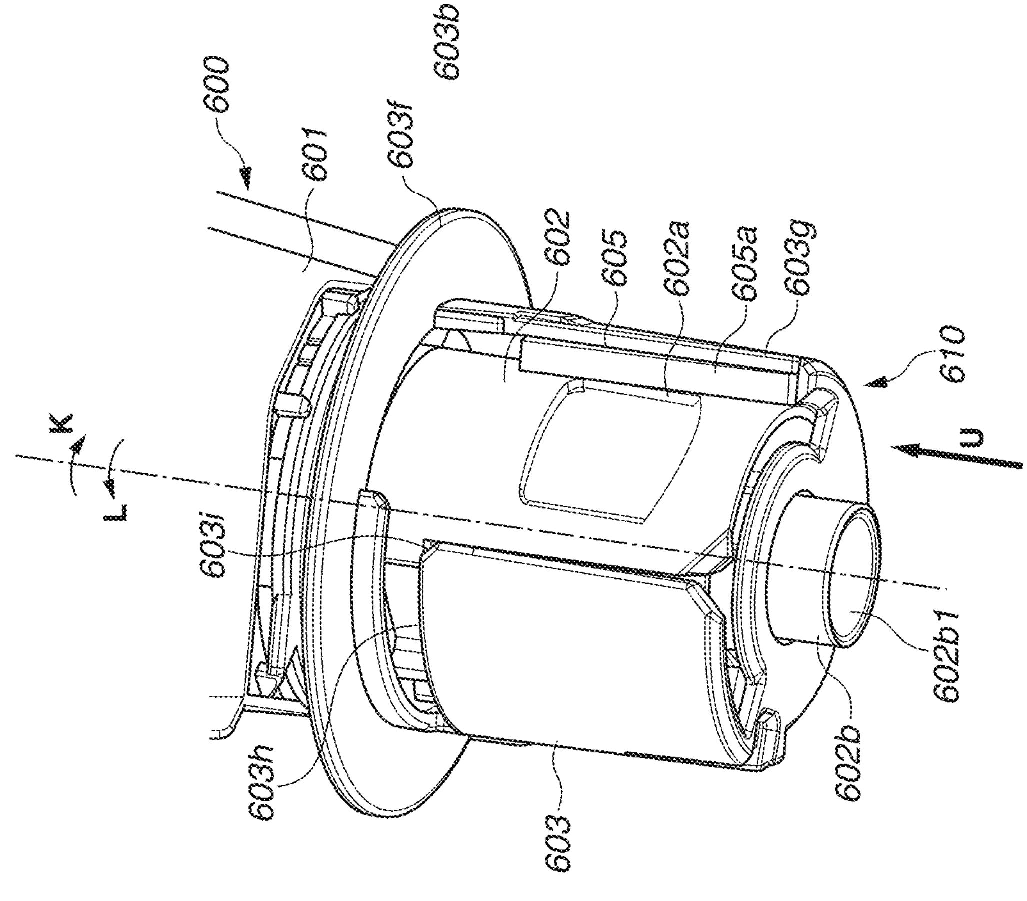
FIG. 7A is a perspective view illustrating the nozzle of the toner pack according to the first exemplary embodiment.

FIG. 4A is a front view of the toner pack 600 when a pack-side shutter 603 is in a covering position. FIG. 4B is a front view of the toner pack 600 when the pack-side shutter 603 is in an uncovering position. FIG. 5 is an exploded perspective view of the toner pack 600. FIG. 6A is an enlarged view of a nozzle 602 and its vicinity when the pack-side shutter 603 is in the covering position. FIG. 6B is a view of the toner pack 600 as viewed in a direction indicated by an arrow U in FIG. 6A. FIG. 7A is an enlarged view of the nozzle 602 and its vicinity when the pack-side shutter 603 is in the uncovering position. FIG. 7B is a view of the toner pack 600 as viewed in the direction indicated by the arrow U in FIG. 7A.

The toner pack 600 includes a pouch (bag or a bag body) 601 serving as a first toner storage portion that stores toner, an outer ring member (coupling ring) 620 to be coupled with the pouch 601, the nozzle 602, and the pack-side shutter 603. The outer ring member 620 and the nozzle 602 constitute a base portion 611 connected to the pouch 601.

As illustrated in FIGS. 4A and 4B, the pouch 601 is provided at one end side of the toner pack 600 in an axial direction D1 as a first direction. A nozzle unit 610 that includes the outer ring member 620, the nozzle 602, and the pack-side shutter 603 is mounted and provided at the other end side of the toner pack 600 in the axial direction D1. The nozzle 602 and the pack-side shutter 603 can also be referred to as a leading edge portion. The nozzle unit 610 functions as a member for discharging toner contained in the pouch 601. The nozzle unit 610 is a communication member (adaptor portion, connecting portion) that enables an inner space (toner storage space) of the pouch 601 to communicate with the replenishment port 32*a* in the printer body 100 when the toner pack 600 is mounted on the mounting unit 500 of the printer body 100.

The pouch 601 is a bag body that is formed of a flexible film member (sheet member), such as a polypropylene film, and has a bag shape with one end open.

As illustrated in FIG. 5, the outer ring member 620 has a coupling surface 620*a* that is coupled with (fixed to) one end of the pouch 601 and is adjacent to an opening (opening portion) 601*a*10 of the pouch 601, and a connecting portion 620*c* that is connected to the nozzle 602. An opening edge 601*a*1 of the pouch 601 is coupled with the coupling surface 620*a* (coupling portion) of the outer ring member 620. Examples of a coupling method include a method using various adhesive agents, such as hot melt, and a method in which the pouch 601 is heat-welded to the outer periphery of the outer ring member 620. However, the coupling method is not particularly limited, and any method can be used as long as the pouch 601 can be sealed so that no toner leakage occurs.

The nozzle 602 serving as a base member is connected to the connecting portion 620*c* of the outer ring member 620 serving as a cylinder member. The connecting portion 620*c* has a hole 620*b*. Toner can pass through the hole 620*b*. This configuration makes it possible to easily fill the pouch 601 with toner through the hole 620*b* and the coupling surface 620*a* of the outer ring member 620. For example, the pouch 601 is filled with toner in a state where the pouch 601 is coupled with a lower portion of the outer ring member 620, and then the nozzle 602 is coupled with the outer ring member 620. This configuration makes it possible to fill the pouch 601 with a larger amount of toner in a shorter time without using a complicated apparatus. This is because the hole 620*b* of the outer ring member 620 has a larger area than a discharge port 602*a* of the nozzle 602, which facilitates filling of toner with a simple a toner flow path.

A side surface 602*c* that is the outer surface of the nozzle 602 extending in the axial direction D1 is provided with the discharge port 602*a* configured to communicate with the inside of the pouch 601 and a recessed portion 602*e*. The nozzle 602 is configured as a path through which toner can pass from the opening 601*a*10 of the pouch 601 to the discharge port 602*a* of the nozzle 602. The recessed portion 602*e* is provided at a different location from the location of the discharge port 602*a* in a rotational direction of the pack-side shutter 603. The toner stored in the pouch 601 is discharged to the outside of the toner pack 600 via the discharge port 602*a*. The base portion 611 can be a resin molded product in which the nozzle 602 and the outer ring member 620 are integrally formed.

The pack-side shutter 603 serving as a container shutter or a first shutter is located on the outer side of the side surface 602*c* of the nozzle 602. The pack-side shutter 603 is provided to be rotatable about a central axis α extending along the axial direction D1 and is provided on the outside of the side surface 602*c* in a radial direction r of a virtual circle VC centered on the central axis α. The side surface 602*c* of the nozzle 602 is a convex curved surface (substantially cylindrical surface) that is convex toward the outside in the radial direction r of the virtual circle VC centered on the central axis α. The inner surface of the pack-side shutter 603, that is, the surface facing the side surface 602*c*, is a curved surface extending along the side surface 602*c* of the nozzle 602. A pack-side seal 605 serving as a first seal member with a substantially rectangular shape is attached to the inner surface. As illustrated in FIGS. 6A and 6B, an end surface 603*g* that forms an opening 603*a* of the pack-side shutter 603 and an end surface 605*a* of the pack-side seal 605 are inclined surfaces inclined with respect to the central axis α. The end surface 605*a* of the pack-side seal 605 is attached at a location that protrudes toward the opening 603*a* more than the end surface 603*g* of the pack-side shutter 603.

The pack-side shutter 603 is configured to be rotatable about the central axis α between a covering position serving as a first covering position where the pack-side seal 605 covers the discharge port 602*a* of the nozzle 602 and an uncovering position serving as a first uncovering position where the discharge port 602*a* is uncovered. When the pack-side shutter 603 is in the uncovering position, the discharge port 602*a* of the nozzle 602 is exposed through the opening 603*a*. As illustrated in FIG. 6A, when the pack-side shutter 603 is in the covering position, at least a part of the recessed portion 602*e* of the nozzle 602 is exposed from the pack-side shutter 603 through the opening 603*a*.

At an end in the axial direction D1 of the pack-side shutter 603 that is adjacent to the pouch 601, a disc-shaped flange portion 603*f* that extends from the substantially cylindrical side surface of the pack-side shutter 603 outwardly in the radial direction r is provided. Specifically, the nozzle unit 610 includes the flange portion 603*f* that is located between the discharge port 602*a* and the pouch 601 in the axial direction D1 (first direction) and that extends from the outer surface of the pack-side shutter 603 outwardly in the radial direction r about the central axis α. The flange portion 603*f* is located above the discharge port 602*a* in an orientation (see FIGS. 13A and 13B) during toner replenishment. This configuration makes it possible to reduce the possibility that a foreign substance falls in the vicinity of the discharge port 602*a* and the replenishment port 32*a*. The flange portion 603*f* can be provided separately from the pack-side shutter 603.

FIGS. 4A and 6A each illustrate a state where the pack-side shutter 603 is in the covering position. FIGS. 4B and 7A each illustrate a state where the pack-side shutter 603 is in the uncovering position. As illustrated in FIGS. 4A and 6A, when the pack-side shutter 603 in the covering position is rotated about the central axis α in a direction indicated by an arrow K, the pack-side shutter 603 reaches the uncovering position illustrated in FIGS. 4B and 7A. In contrast, when the pack-side shutter 603 in the uncovering position is rotated in a direction indicated by an arrow L, the pack-side shutter 603 reaches the covering position. During the rotational operation of the pack-side shutter 603, the pack-side shutter 603 slides on the side surface 602*c* of the nozzle 602 via the pack-side seal 605.

Mounting Unit

Figure 8A:
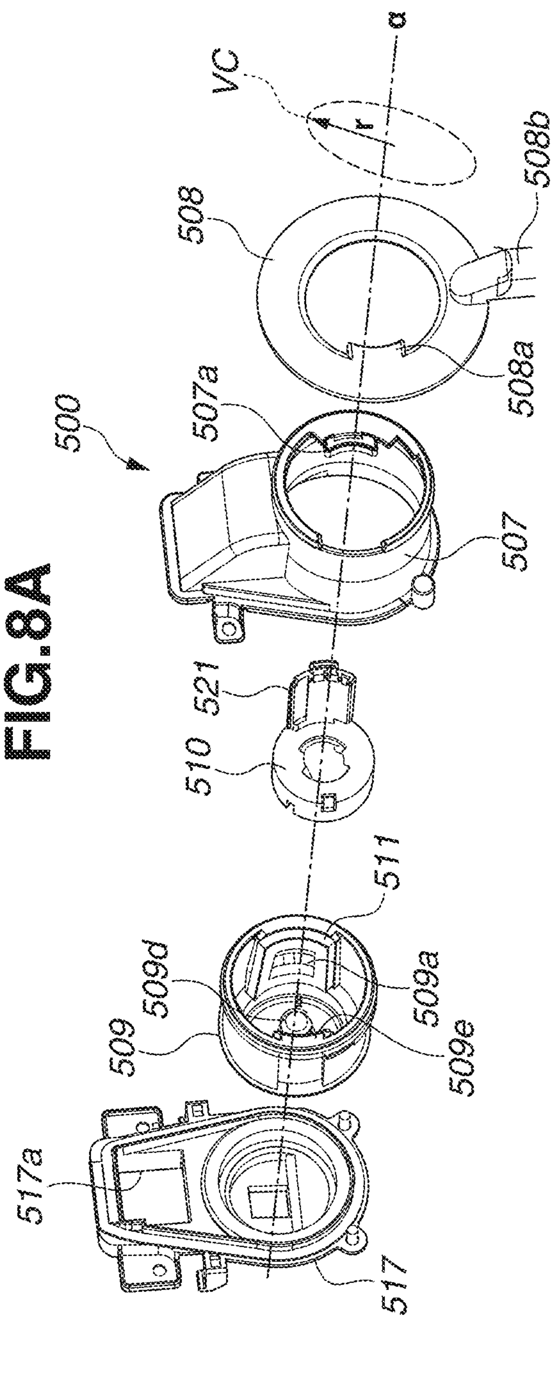
FIGS. 8A and 8B are exploded views each illustrating a mounting unit according to the first exemplary embodiment.
Figure 8B:
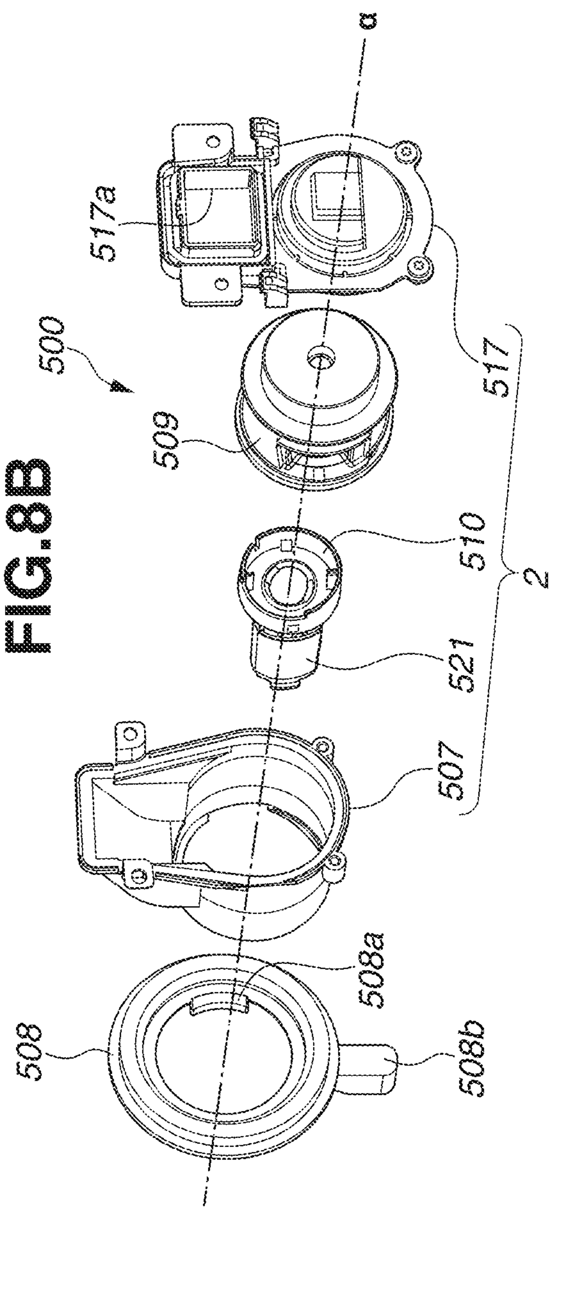
Figure 9B:
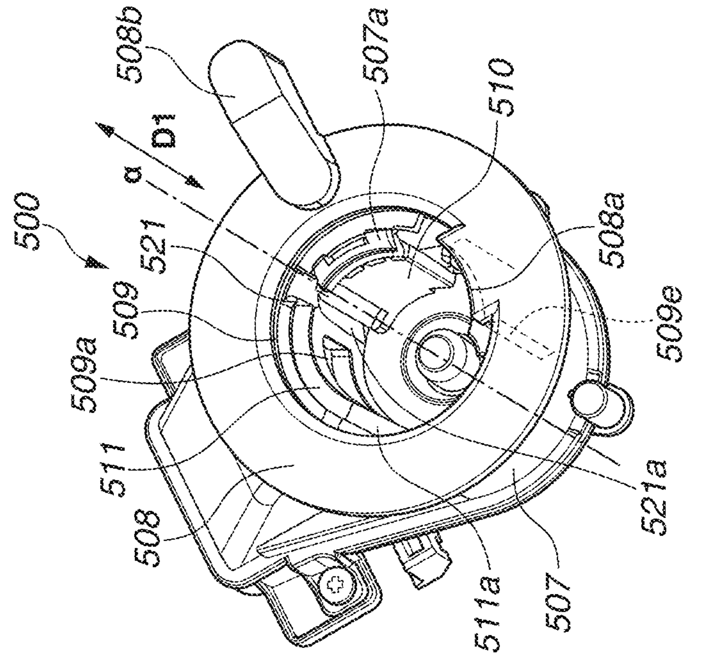
FIGS. 9A and 9B are perspective views each illustrating the mounting unit according to the first exemplary embodiment.
Figure 9A:
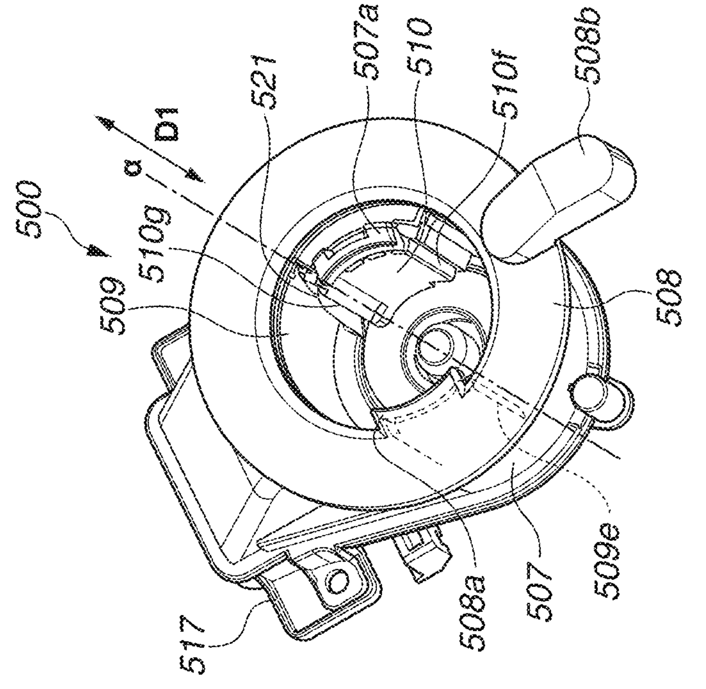
Figure 10A:
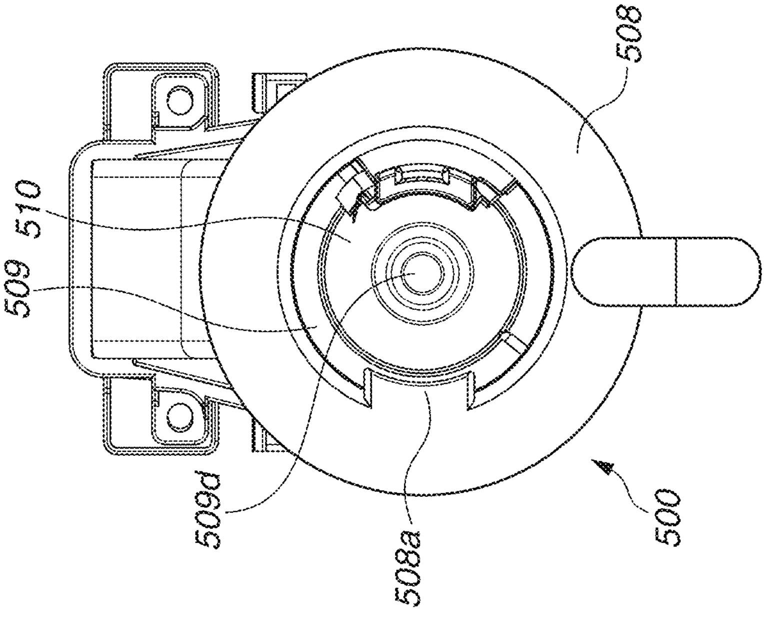
FIGS. 10A and 10B are plan views each illustrating the mounting unit according to the first exemplary embodiment.
Figure 10B:
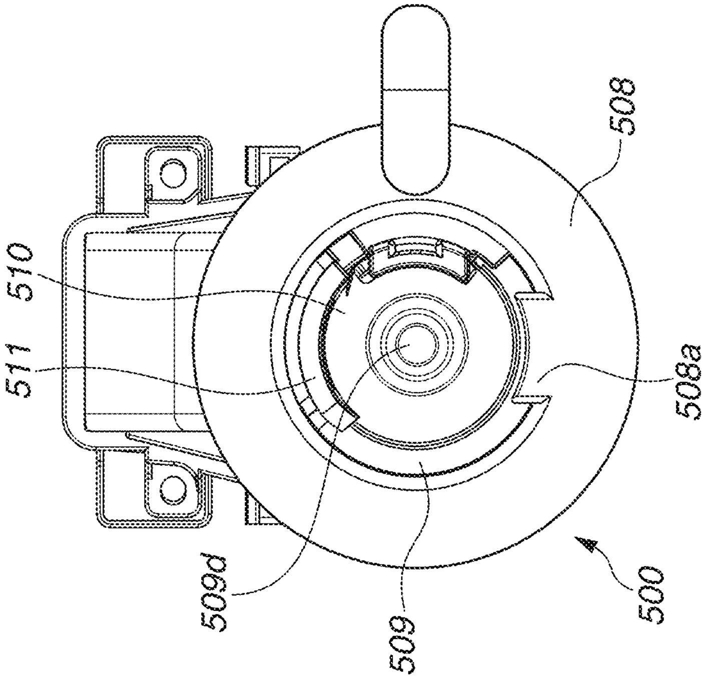

Next, a configuration example of the mounting unit 500 on which the toner pack 600 is mounted will be described with reference to FIGS. 8A to 12B. According to the present exemplary embodiment, the mounting unit 500 is a unit for mounting the toner pack 600 and is provided in the image forming apparatus 1 (see FIG. 3). FIG. 8A is an exploded perspective view of the mounting unit 500. FIG. 8B is an exploded perspective view of the mounting unit 500 as viewed in a direction different from that in FIG. 8A. FIG. 9A and FIG. 10A are a perspective view of the external appearance of the mounting unit 500 and a view of the mounting unit 500 as viewed in a mounting direction M when the lever 508 is in the closed position, respectively. FIGS. 9B and 10B are a perspective view of the external appearance of the mounting unit 500 and a view of the mounting unit 500 as viewed in the mounting direction M when the lever 508 is in the open position, respectively.

Figure 11A:
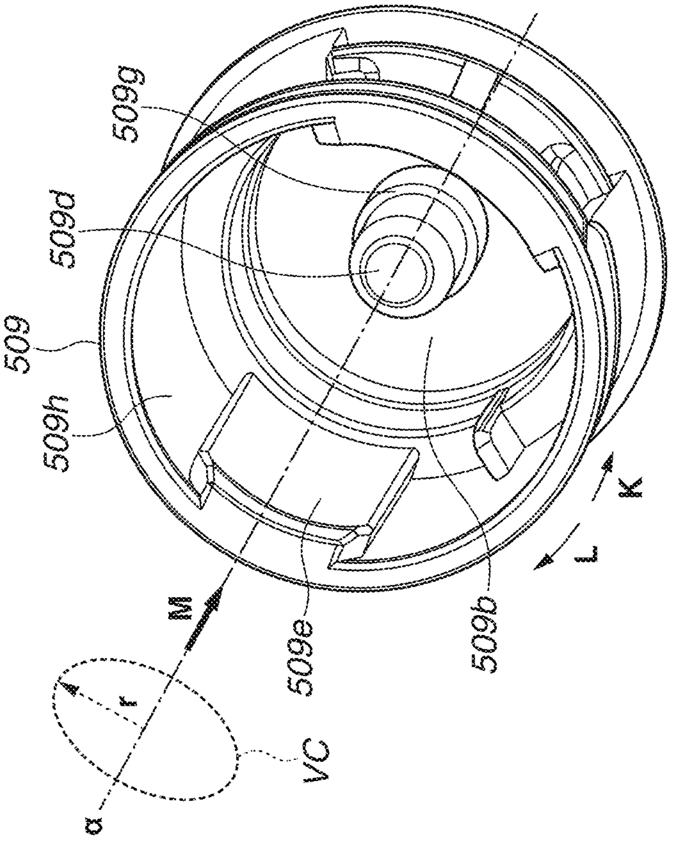
FIGS. 11A and 11B are perspective views each illustrating an apparatus-side shutter of the mounting unit according to the first exemplary embodiment.

FIG. 11A is a perspective view of an apparatus-side shutter 509 as viewed from the upstream side in the mounting direction M.

Figure 11B:
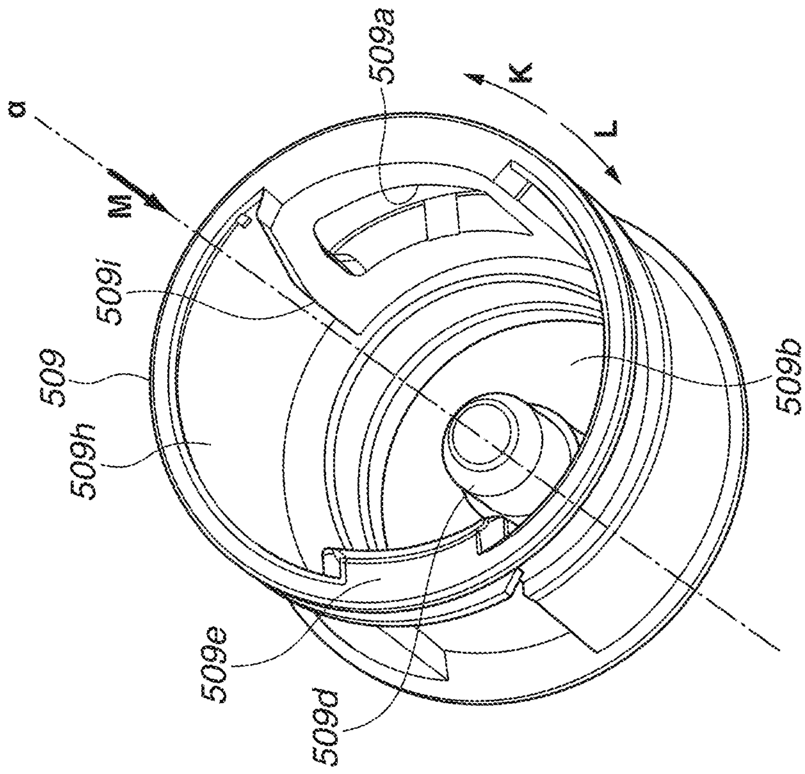

FIG. 11B is a perspective view of the apparatus-side shutter 509 as viewed from a different viewpoint from that in FIG. 11A.

Figure 12B:
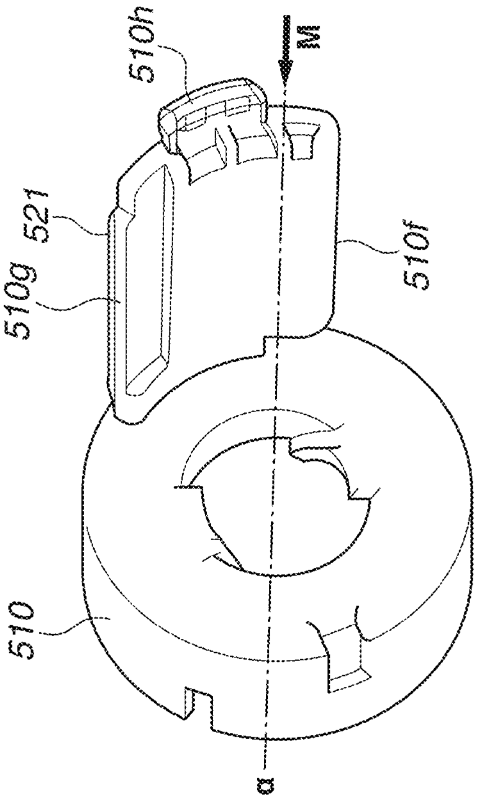
FIGS. 12A and 12B are perspective views each illustrating a cover and a shutter sheet of the mounting unit according to the first exemplary embodiment.
Figure 12A:
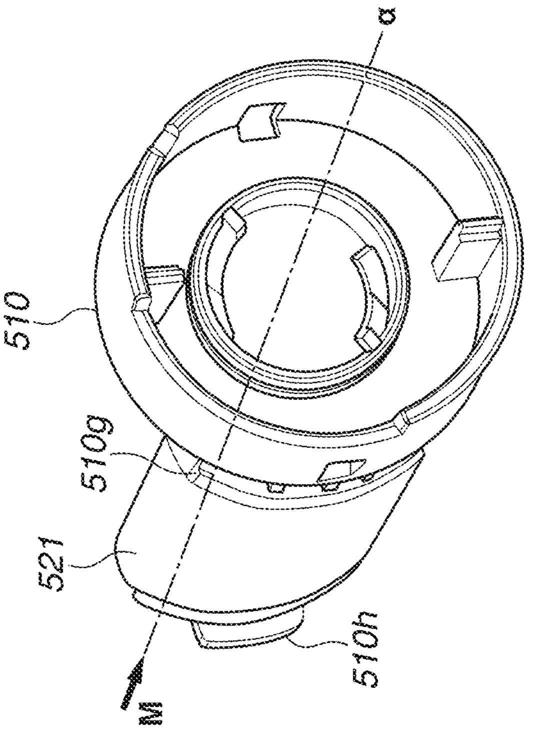

FIG. 12A is a perspective view of a cover 510 and a shutter sheet 521 as viewed from the downstream side in the mounting direction M. FIG. 12B is a perspective view of the cover 510 as viewed from the upstream side in the mounting direction M.

As illustrated in FIGS. 8A to 9B, the mounting unit 500 includes a body base portion 2. The body base portion 2 includes a first frame 507, a second frame 517, the cover 510, and the shutter sheet 521. The cover 510 and the second frame 517 are fixed to the first frame 507. As illustrated in FIGS. 12A and 12B, the cover 510 includes an engaged portion 510*h* to be engaged with a positioning portion 507*a* (see FIG. 8A) of the first frame 507 so as not to rotate about the central axis α relative to the first frame 507. The first frame 507, the cover 510, and the second frame 517 need not necessarily be separate members, but instead can be an integrally formed member. As illustrated in FIGS. 8A and 8B, the second frame 517 is provided with an apparatus-side opening 517*a* serving as a receiving inlet. The apparatus-side opening 517*a* communicates with the storage portion 36 (see FIG. 2A) of the developing container 32.

The lever 508 and the apparatus-side shutter 509 are each mounted on the body base portion 2 in a rotatable manner about the central axis α. The first frame 507 is provided with the positioning portion 507*a*. The positioning portion 507*a* protrudes inwardly from an inner peripheral surface of the first frame 507 centered on the central axis α in the radial direction r of the virtual circle VC centered on the central axis α.

The lever 508 is provided with a drive transmission portion 508*a* and an operation portion 508*b*.

The user operates the operation portion 508*b* to enable the lever 508 to rotate about the central axis α relative to the body base portion 2. As illustrated in FIG. 8A, the drive transmission portion 508*a* of the lever 508 is a protrusion protruding inwardly from the inner peripheral surface of the lever 508 centered on the central axis α in the radial direction r of the virtual circle VC centered on the central axis α.

As illustrated in FIGS. 11A and 11B, the apparatus-side shutter 509 serving as a body shutter or a second shutter includes an inner peripheral surface 509*h*, a communication port 509_a_ formed in the inner peripheral surface 509_h_ to receive toner from the toner pack 600, and a bottom surface 509_b_. The apparatus-side shutter 509 further includes a center boss 509_d_, a drive transmitted portion 509_e_, and a pack contact surface 509_g_. As illustrated in FIG. 11A, the drive transmitted portion 509_e_ is a protrusion protruding inwardly in the radial direction r of the imaginary circle VC centered on the central axis α. An apparatus-side seal 511 serving as a second seal member is attached to the inner peripheral surface 509_h_ so as to surround the circumference of the communication port 509_a_ (see FIG. 9B).

The apparatus-side shutter 509 is configured to have a covering position as a second covering position and an uncovering position as a second uncovering position relative to the body base 2. Specifically, as illustrated in FIGS. 11A and 11B, the apparatus-side shutter 509 rotates in the direction indicated by the arrow K toward the uncovering position from the covering position, and rotates in the direction indicated by the arrow L toward the covering position from the uncovering position. The direction indicated by the arrow K and the direction indicated by the arrow L are respectively similar to the direction indicated by the arrow K and the direction indicated by the arrow L as the rotational direction of the pack-side shutter 603 illustrated in FIG. 6A. The communication port 509_a_ of the apparatus-side shutter 509 in the covering position is covered with the apparatus-side seal 511 and the cover 510, and the communication port 509_a_ of the apparatus-side shutter 509 in the uncovering position is not covered with the cover 510 and is open. In other words, when the apparatus-side shutter 509 is in the covering position, the communication port 509_a_ does not communicate with the apparatus-side opening 517_a_ of the second frame 517, and when the apparatus-side shutter 509 is in the covering position, the communication port 509_a_ communicates with the apparatus-side opening 517_a_ of the second frame 517.

As illustrated in FIG. 9B, an end surface 511_a_ of the apparatus-side seal 511 protrudes in a circumferential direction from an end surface 509_i_ (FIG. 11B) serving as an attachment seat surface on the circumference of the communication port 509_a_. The end surface 511_a_ is an inclined surface.

The apparatus-side shutter 509 is located in the covering position in FIGS. 9A and 10A. In this case, the communication port 509_a_ of the apparatus-side shutter 509 does not communicate with the apparatus-side opening 517_a_ of the second frame 517. The apparatus-side shutter 509 is located in the uncovering position in FIGS. 9B and 10B. In this case, the communication port 509_a_ of the apparatus-side shutter 509 communicates with the apparatus-side opening 517_a_ of the second frame 517. By moving the apparatus-side shutter 509 to the uncovering position, the storage portion 36 of the developing container 32 can be replenished (supplied) with toner from the toner pack 600 via the communication port 509_a_.

The lever 508 and the apparatus-side shutter 509 are not driven in conjunction with each other. Accordingly, the apparatus-side shutter 509 does not rotate even when the lever 508 is operated in a state where the toner pack 600 is not mounted.

The shutter sheet 521 serving as a sheet member as illustrated in FIGS. 9A and 9B and FIGS. 12A and 12B is a film having a thickness of about 100 μm and is fixed to the cover 510 with a double-sided adhesive tape or the like.

The shutter sheet 521 slides on the apparatus-side seal 511 attached to the apparatus-side shutter 509 when the apparatus-side shutter 509 rotates between the covering position and the uncovering position.

Mounting of Toner Pack on Mounting Unit

Figure 13A:
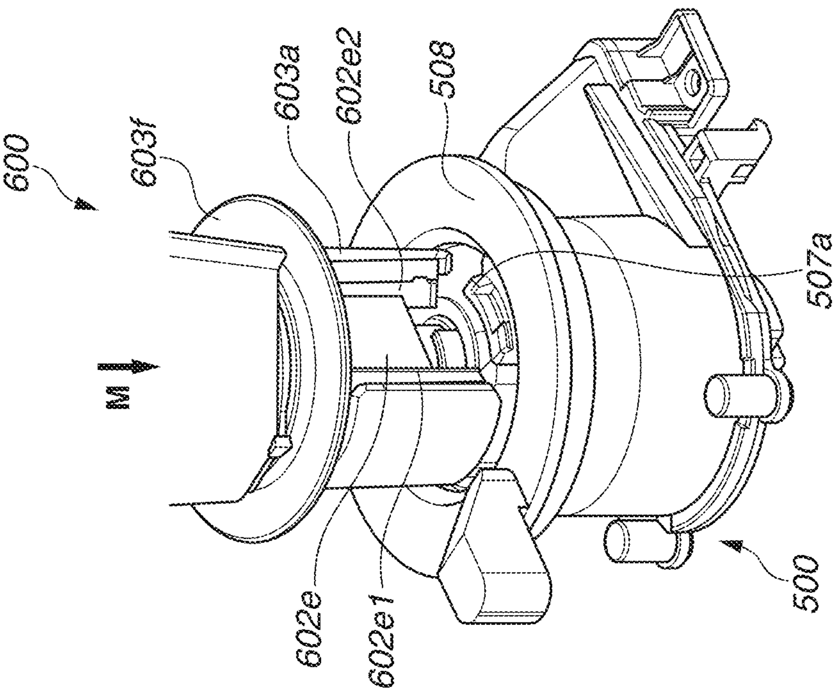
FIGS. 13A and 13B are perspective views each illustrating a state where the toner pack according to the first exemplary embodiment is being mounted on the mounting unit.
Figure 13B:
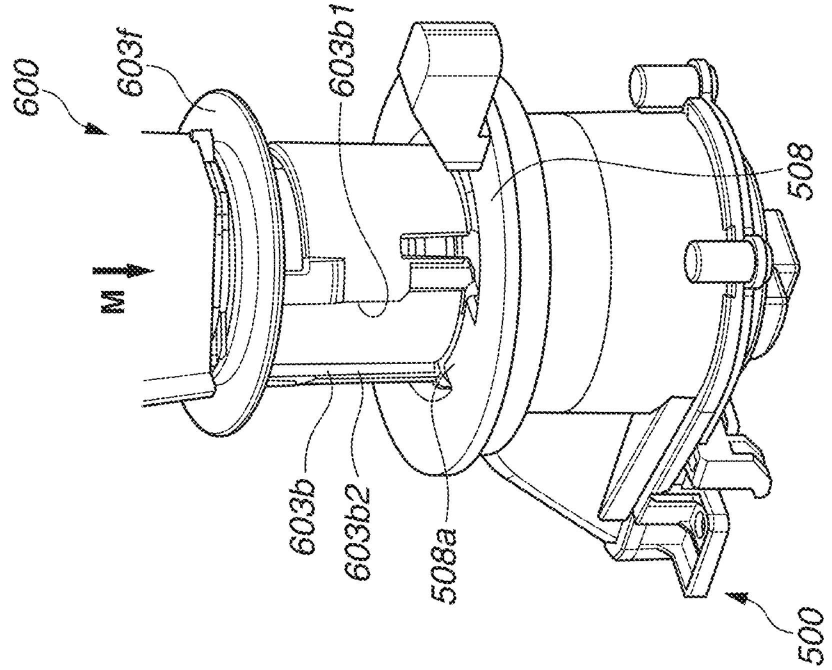
Figure 14:
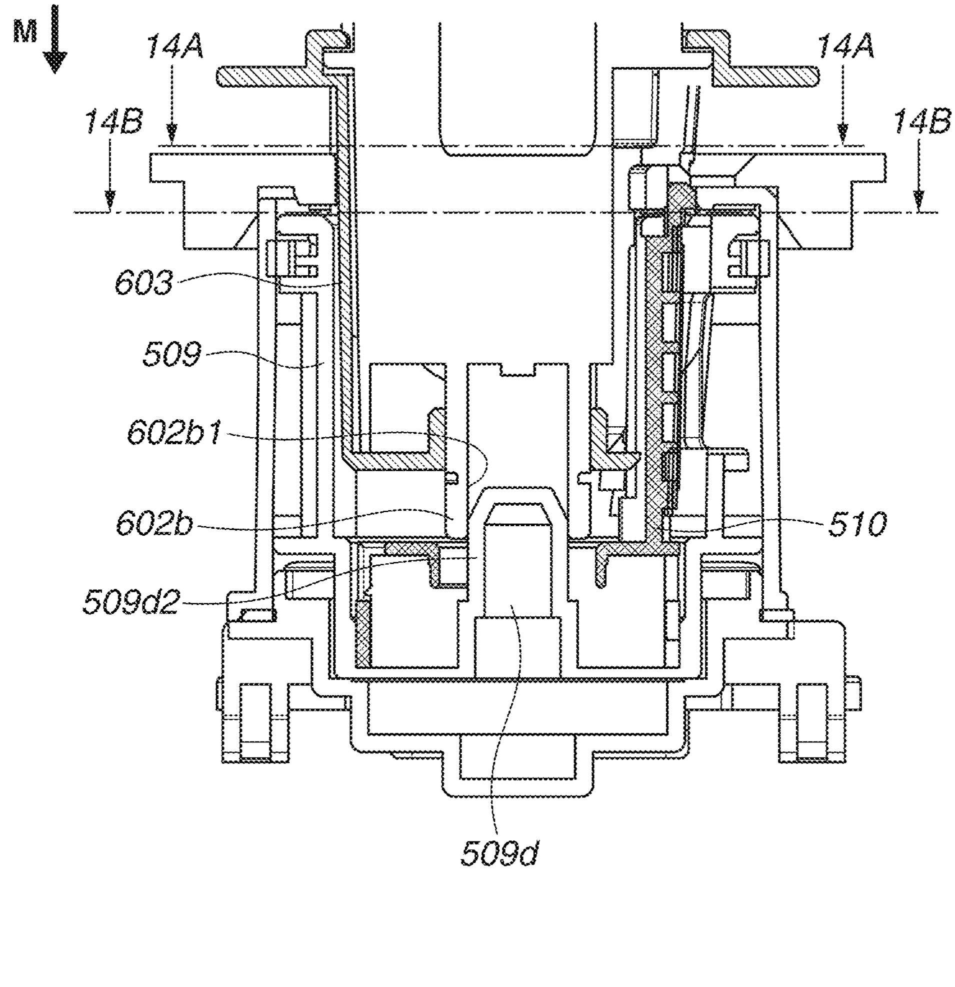
FIG. 14 is a sectional view illustrating a state where the toner pack according to the first exemplary embodiment is being mounted on the mounting unit.
Figure 15B:
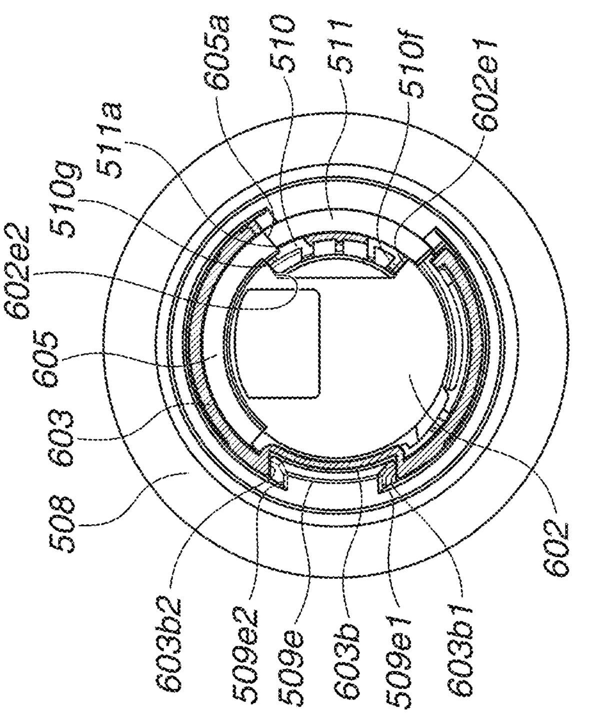
FIG. 15B is a sectional view of the toner pack and the mounting unit taken along a line 14B-14B in FIG. 14.
Figure 15A:
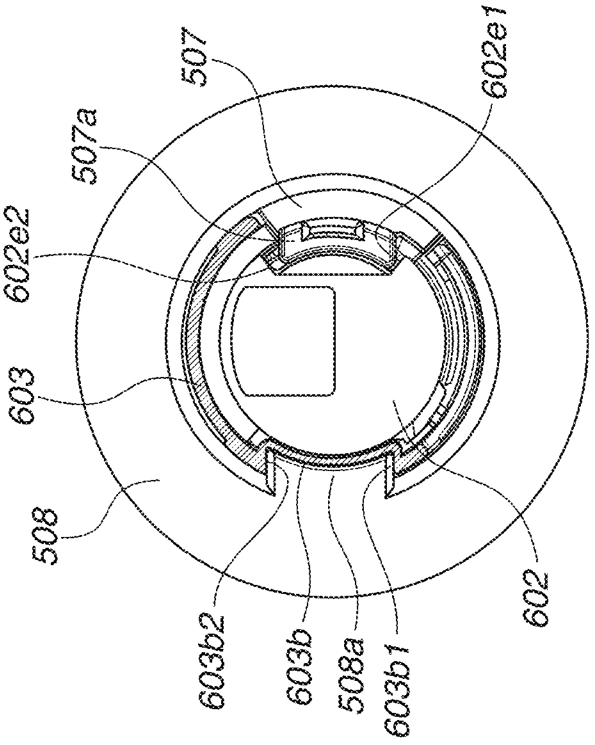
FIG. 15A is a sectional view of the toner pack and the mounting unit taken along a line 14A-14A in FIG. 14.

Next, a state where the toner pack 600 is mounted on the mounting unit 500 will be described with reference to FIGS. 13A to 15B. FIGS. 13A and 13B are perspective views each illustrating a state where the toner pack 600 is being mounted on the mounting unit 500 as viewed from different angles. FIG. 14 is a sectional view parallel to the central axis α in a state where the toner pack 600 is moved in the mounting direction from the state illustrated in FIGS. 13A and 13B. FIG. 15A is a sectional view of the toner pack 600 taken along a line 14A-14A in FIG. 14. FIG. 15B is a sectional view of the toner pack 600 taken along a line 14B-14B in FIG. 14. For ease of viewing, in FIGS. 14 to FIG. 15B, the section of each of the pack-side shutter 603 and the cover 510 is illustrated as a shaded area.

In the following description, the user moves the toner pack 600 in a state where the pack-side shutter 603 is in the covering position in the mounting direction M to mount the toner pack 600 on the mounting unit 500 in a state where the apparatus-side shutter 509 is in the covering position as illustrated in FIGS. 13A and 13B. In this case, the end surface 511_a_ of the apparatus-side seal 511 and the end surface 605_a_ of the pack-side seal 605 contact in an overlapping manner in the circumferential direction and slide while being deformed in the mounting direction M. In other words, the end surface 605_a_ of the pack-side seal 605 contacts the end surface 511_a_ of the apparatus-side seal 511 in a state where the toner pack 600 is mounted on the body base portion 2.

The end surface 605_a_ of the pack-side seal 605 protrudes toward the opening 603_a_ of the pack-side shutter 603. Accordingly, when the toner pack 600 is mounted on the body base portion 2, the end surface 605_a_ and the end surface 511_a_ are brought into pressure contact with each other. This brings the pack-side seal 605 and the apparatus-side seal 511 into close contact with each other, thereby improving the sealing performance and reducing toner leakage. The end surface 605_a_ and the end surface 511_a_ extend toward the rotational direction (directions indicated by arrows K and L) of the pack-side shutter 603 in the direction of the central axis α (axial direction D1). Accordingly, the resistance during mounting of the toner pack 600 on the mounting unit 500 can be reduced. Consequently, the toner pack 600 can be smoothly mounted on the mounting unit 500, which improves the operability.

The user aligns the recessed portion 602_e_ of the nozzle 602 and the opening 603_a_ of the pack-side shutter 603 with the positioning portion 507_a_ of the first frame 507. At the same time, the user aligns a drive transmitted portion 603_b_ of the pack-side shutter 603 with the drive transmission portion 508_a_ of the lever 508.

After aligning the toner pack 600 with the mounting unit 500, the user moves the toner pack 600 in the mounting direction M to mount the toner pack 600 on the mounting unit 500. Then, as illustrated in FIG. 14, a small diameter portion 509_d_2 of the center boss 509_d_ of the apparatus-side shutter 509 is fitted to an inner peripheral surface 602_b_1 of a protrusion 602_b_ of the nozzle 602. This operation determines the position of the nozzle 602 relative to the apparatus-side shutter 509 in the radial direction. In addition, the leading edge portion of the protrusion 602_b_ of the nozzle

602 is brought into contact with the pack contact surface 509*g* of the apparatus-side shutter 509, thereby positioning the toner pack 600 in the mounting direction M.

In this case, as illustrated in FIG. 15B, an end surface 510*f* and an end surface 510*g* of the cover 510 are in close contact or engage with surfaces 602*e*1 and 602*e*2 that form the recessed portion 602*e* of the nozzle 602.

As illustrated in FIGS. 15A and 15B, the drive transmitted portion 603*b* of the pack-side shutter 603 engages with the drive transmitted portion 509*e* of the apparatus-side shutter 509 and the drive transmission portion 508*a* of the lever 508. As a result, the central axis of the pack-side shutter 603 and the central axis of the apparatus-side shutter 509 are substantially coaxial (central axis α). Since the surfaces 602*e*1 and 602*e*2 of the recessed portion 602*e* of the nozzle 602 respectively engage with the end surfaces 510*f* and 510*g* of the cover 510, the nozzle 602 of the toner pack 600 does not rotate relative to the body base portion 2 including the cover 510. In other words, the recessed portion 602*e* serving as an engaging portion engages with the cover 510 serving as an engaged portion of the image forming apparatus 1 when the toner pack 600 is mounted on the image forming apparatus 1, thereby regulating the rotation of the nozzle 602 relative to the image forming apparatus 1.

The lever 508, the pack-side shutter 603, and the apparatus-side shutter 509 can substantially integrally rotate about the central axis α relative to the body base portion 2 and the nozzle 602.

For example, when the lever 508 is rotated from the closed position to the open position, the drive transmission portion 508*a* serving as a second engaging portion of the lever 508 presses a surface 603*b*1 serving as a first engaged portion of the pack-side shutter 603. This allows the pack-side shutter 603 to rotate from the covering position to the uncovering position together with the lever 508. A surface 603*b*2 serving as a first engaging portion of the pack-side shutter 603 rotated from the covering position to the uncovering position presses a surface 509*e*2 serving as a second engaged portion of the apparatus-side shutter 509. This allows the apparatus-side shutter 509 to rotate from the covering position to the uncovering position together with the pack-side shutter 603.

On the other hand, when the lever 508 is rotated from the open position to the closed position, the drive transmission portion 508*a* of the lever 508 presses the surface 603*b*2 of the pack-side shutter 603. This allows the pack-side shutter 603 to rotate from the uncovering position to the covering position together with the lever 508. The surface 603*b*1 of the pack-side shutter 603 rotated from the uncovering position to the covering position presses a surface 509*e*1 of the drive transmitted portion 509*e* of the apparatus-side shutter 509. This allows the apparatus-side shutter 509 to rotate from the uncovering position to the covering position together with the pack-side shutter 603.

By operating the lever 508 in this manner, the pack-side shutter 603 and the apparatus-side shutter 509 can be rotated between the covering position and the uncovering position, thereby making it possible to replenish the developing container 32 with toner from the toner pack 600. After completion of replenishing the developing container 32 with toner from the toner pack 600, the user rotates the lever 508 from the open position to the closed position to pull out the toner pack 600 from the mounting unit 500.

When the pack-side shutter 603 and the apparatus-side shutter 509 rotate, the end surface 511*a* of the apparatus-side seal 511 and the end surface 605*a* of the pack-side seal 605 are in close contact with each other and do not form any gap, which prevents the entrance of toner.

Groove Portion of Pack-Side Shutter

As illustrated in FIG. 7A, the pack-side shutter 603 is provided with a groove portion 603*h* extending in the circumferential direction, i.e., the rotational direction (directions indicated by arrows K and L in FIG. 6A) of the pack-side shutter 603. As described above, when the toner pack 600 is mounted on the mounting unit 500 and the lever 508 is rotated from the closed position illustrated in FIG. 9A to the open position illustrated in FIG. 9B, the drive transmission portion 508*a* of the lever 508 enters the groove portion 603*h* of the pack-side shutter 603. In a state where the drive transmission portion 508*a* is in the groove portion 603*h*, the drive transmission portion 508*a* is caught on the toner pack 600, thereby regulating the toner pack 600 from being pulled out from the mounting unit 500.

Thus, once replenishment of toner from the toner pack 600 into the developing container 32 begins, the toner pack 600 is prevented from moving from the mounting unit 500 in a direction opposite to the mounting direction M, thereby preventing the toner from leaking to the outside of the image forming apparatus 1.

As illustrated in FIG. 7A, a tapered portion 603*i* with a tapered shape that is inclined with respect to the circumferential direction and the axial direction D1 is formed at an entrance portion of the groove portion 603*h*. In other words, the tapered portion 603*i* extends toward the rotational direction (directions indicated by arrows K and L) of the pack-side shutter 603 in the direction of the central axis α (axial direction D1). In the case of mounting the toner pack 600 on the mounting unit 500, the tapered portion 603*i* facilitates the user to insert the drive transmission portion 508*a* into the groove portion 603*h* even when the toner pack 600 is slightly displaced from the mounting direction M. When the toner pack 600 is pulled out from the mounting unit 500, the drive transmission portion 508*a* of the lever 508 is brought into contact with the tapered portion 603*i* if the rotational movement of the lever 508 to the closed position is insufficient. In this case, if the user pulls out the toner pack 600 from the mounting unit 500, the drive transmission portion 508*a* is pressed against the tapered portion 603*i*, thereby enabling the lever 508 to rotate to the closed position and return to the proper position.

As described above, the provision of the groove portion 603*h* and the tapered portion 603*i* on the pack-side shutter 603 makes it possible to prevent the toner pack 600 from falling out, facilitate the rotational operation of the lever 508, and enable the lever 508 to return to the proper covering position. Also, when the toner pack 600 is mounted on the mounting unit 500 again, for example, components are prevented from interfering with each other, which leads to an improvement in operability.

Details of Pouch

Figure 16A:
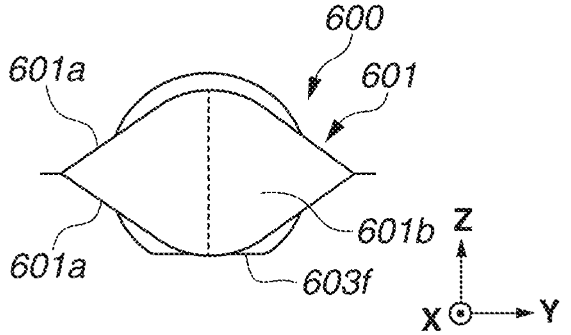
FIG. 16A is a plan view illustrating the toner pack (before the cap is removed) according to the first exemplary embodiment.
Figure 16B:
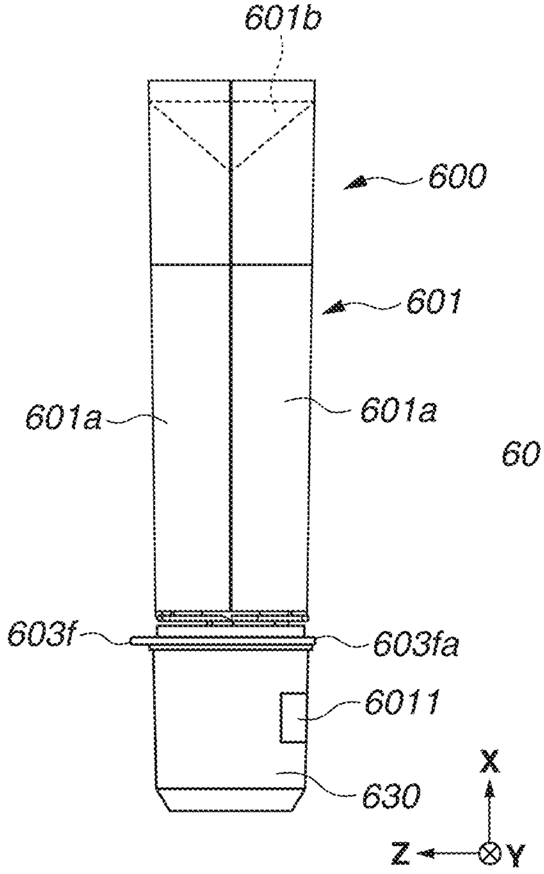
FIG. 16B is a side view of the toner pack.
Figure 16C:
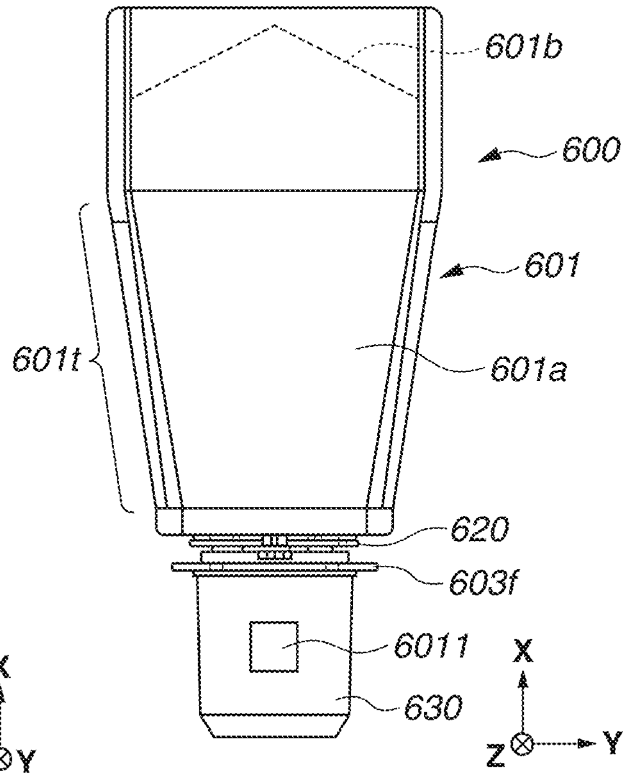
FIG. 16C is a front view of the toner pack.
Figure 16D:
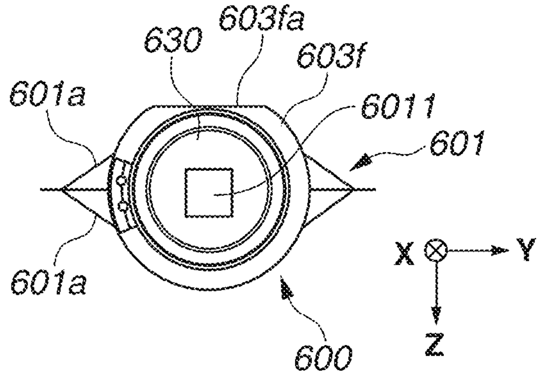
FIG. 16D is a bottom view of the toner pack.

Next, the pouch 601 of the toner pack 600 will be described with reference to FIGS. 16A to 18F. FIGS. 16A to 16D each illustrate the toner pack 600 in a state where a cap 630 for protection is mounted on the nozzle unit 610. As described above, the nozzle 602 and the pack-side shutter 603 can also be referred to as a leading edge portion, and the leading edge portion can include the cap 630. FIG. 16A is a plan view of the toner pack 600. FIG. 16B is a side view of the toner pack 600. FIG. 16C is a front view of the toner pack 600. FIG. 16D is a bottom view of the toner pack 600. The toner pack 600 illustrated in FIGS. 16A to 18F has substantially the same configuration as the toner pack 600 illustrated in FIGS. 4A to 7B, except for a slight difference in the shape of the outer ring member 620.

Figure 17A:
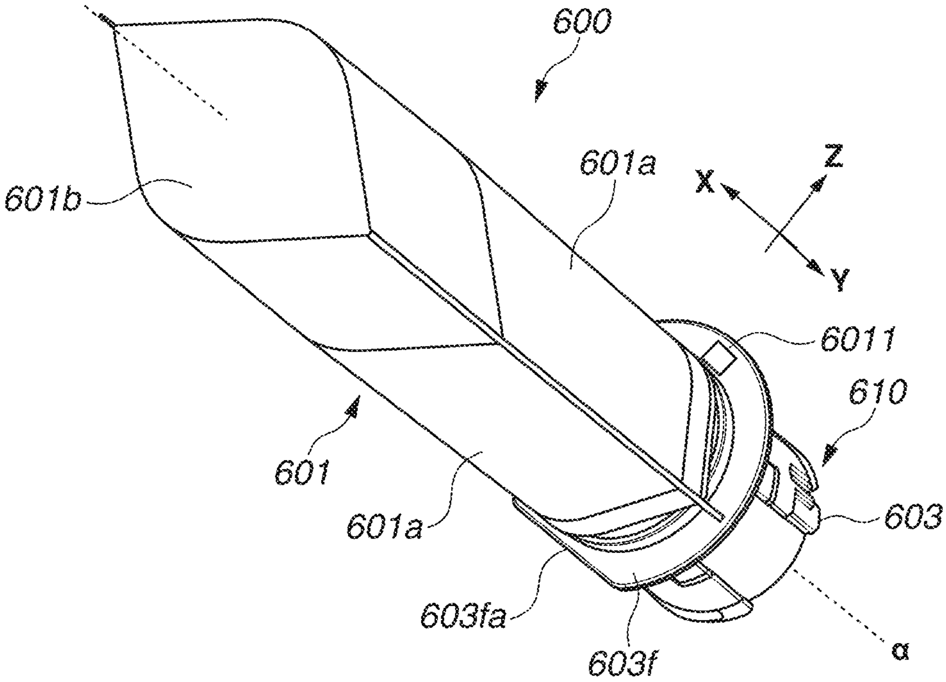
FIGS. 17A and 17B are perspective views each illustrating the toner pack according to the first exemplary embodiment.
Figure 17B:
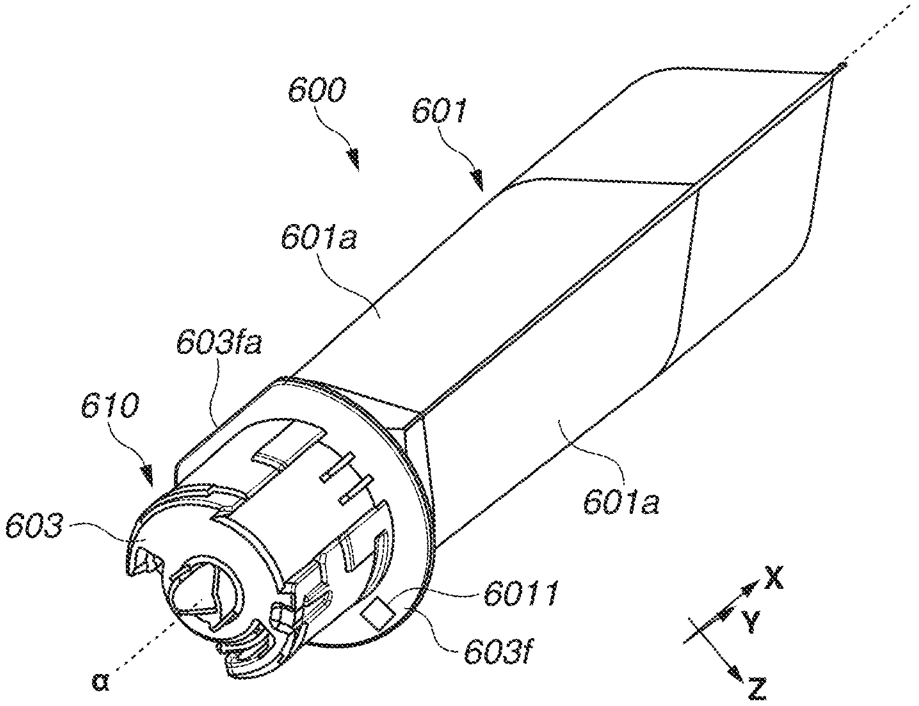
Figures 18A, 18B, 18C, 18D, 18E, 18F:
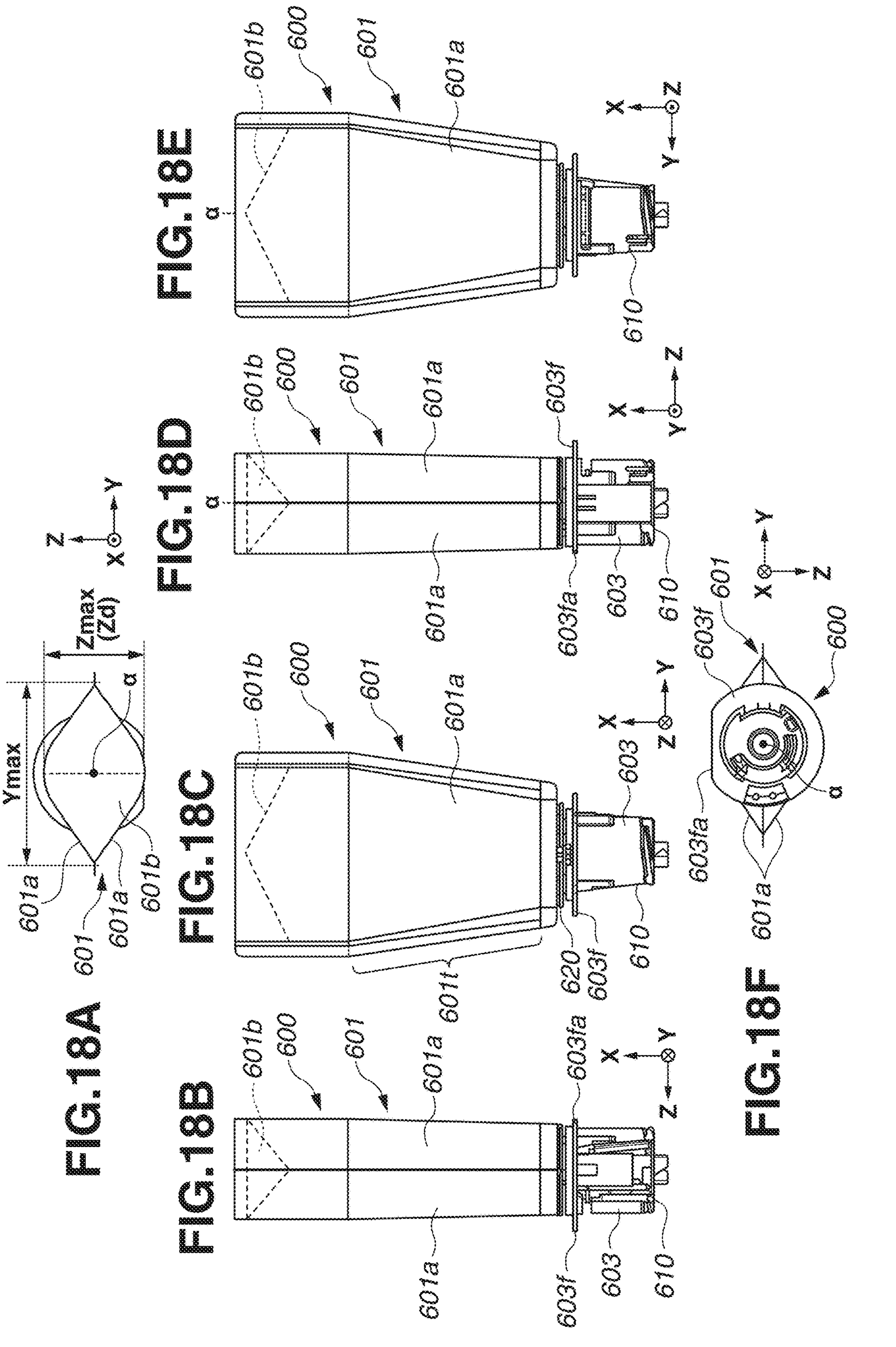
FIG. 18A is a plan view illustrating the toner pack according to the first exemplary embodiment.
FIG. 18B is a left side view of the toner pack.
FIG. 18C is a front view of the toner pack.
FIG. 18D is a right side view of the toner pack.
FIG. 18E is a back view of the toner pack.
FIG. 18F is a bottom view of the toner pack.

FIGS. 17A and 17B are perspective views each illustrating the toner pack 600 in a state where the cap 630 is removed. FIGS. 18A to 18F are six principal views of the toner pack 600 in a state where the cap 630 is removed by a third angle projection method. FIG. 18A is a plan view of the toner pack 600. FIG. 18B is a left side view of the toner pack 600. FIG. 18C is a front view of the toner pack 600. FIG. 18D is a right side view of the toner pack 600. FIG. 18E is a back view of the toner pack 600. FIG. 18F is a bottom view of the toner pack 600.

To define the shape of each of the toner pack 600 and the pouch 601, the following description and the drawings use an X-axis direction (first direction), a Y-axis direction (second direction), and a Z-axis direction (third direction) that are perpendicular to one another. The X-axis direction is a direction from the side of the nozzle unit 610 (base portion 611) to the side of the pouch 601. The X-axis direction according to the present exemplary embodiment is a direction substantially parallel to the axial direction D1 of the central axis α of the pack-side shutter 603. The Y-axis direction is the longitudinal direction of the pouch 601 as viewed in the X-axis direction. The Z-axis direction is the transverse direction of the pouch 601 as viewed in the X-axis direction. In other words, the toner pack 600 according to the present exemplary embodiment has a shape in which the maximum length of the pouch 601 in the Y-axis direction is greater than the maximum length of the pouch 601 in the Z-axis direction as viewed in the X-axis direction.

As illustrated in FIGS. 16A to 18F, the pouch 601 is a bag body formed of a flexible film member (sheet member). The term "flexibility" as used herein refers to flexibility of a degree that allows the user to easily deform and reduce the volume of the pouch 601 by kneading the pouch 601 with user's hands in a state where the discharge port 602*a* is open, thereby facilitating toner discharge. The pouch 601 has side surface portions 601*a* each formed of two film members, and a bottom portion (gusset portion, bottom gusset) 601*b* formed of one film member. The pouch 601 is formed into a bottomed tubular shape by joining the film members together by a method such as heat welding. A method for manufacturing the pouch 601 will be described in more detail below. The configuration of the pouch 601 is not limited to the above-described configuration. For example, the side surface portions 601*a* and the bottom portion (gusset portion, bottom gusset) 601*b* can be formed of a single film member by bending the film member.

For example, a polypropylene film can be used as the film member to form the pouch 601. In a configuration example according to the present exemplary embodiment, a polypropylene film with a thickness of 110 μm is used. The material of the film member is not limited to polypropylene. For example, another synthetic resin, such as polyethylene or polyethylene terephthalate can be used. Alternatively, the film member can be a laminate material including a base layer of polypropylene or the like and a layer of another material stacked on the base layer. For example, a heat-sealing layer can be provided as a surface layer (surface layer to be welded) of a film member that softens at a lower temperature than the base layer to enhance the weldability. In addition, for example, a barrier layer such as a metallic vapor deposition film, or a surface layer for enhancing the printability of the exposed surface of the pouch 601 can be provided. Film members made of different materials can be used for the side surface portions 601*a* and the bottom portion 601*b*, respectively.

Each side surface portion 601*a* of the pouch 601 is a tubular portion extending in the X-axis direction while forming a storage space for storing toner on the inside of the side surface portion 601*a*. In other words, each side surface portion 601*a* of the pouch 601 extends along the first direction that connects the opening 601*a*10 side and the bottom portion 601*b* side that is opposite to the opening side.

Each side surface portion 601*a* according to the present exemplary embodiment is formed in a tubular shape by joining side edge portions of two film members in the Y-axis direction on the entire area in the X-axis direction by a welding method or the like. The sectional shape of each side surface portion 601*a* as viewed in the X-axis direction is a spindle shape having the longitudinal direction in the Y-axis direction and the transverse direction in the Z-axis direction.

The bottom portion 601*b* of the pouch 601 is a portion for sealing the toner storage space from one side in the X-axis direction (first direction). The bottom portion 601*b* according to the present exemplary embodiment is formed by joining peripheral edge portions of a single film member with the two film members, which constitute the side surface portions 601*a*, respectively, by a welding method or the like. The shape of the bottom portion 601*b* as viewed in the X-axis direction is a spindle shape having the longitudinal direction in the Y-axis direction and the transverse direction in the Z-axis direction.

In this case, the nozzle unit 610 is a discharge member for discharging toner in the storage space to the outside. The nozzle unit 610 is provided with a top surface portion 620*d* (see FIG. 19B) as an opposed surface that faces the bottom portion 601*b* of the pouch 601 in the X-axis direction. The top surface portion 620*d* is an end surface of the outer ring member 620 in the X-axis direction and extends in a direction intersecting the X-axis direction. The shape of the top surface portion 620*d* as viewed in the X-axis direction is a projected shape of a spindle shape having the longitudinal direction in the Y-axis direction and the transverse direction in the Z-axis direction on a plane parallel to a YZ plane.

The top surface portion 620*d* is a surface exposed to the storage space in the pouch 601 in a state where the pouch 601 is mounted on the nozzle unit 610. In other words, the storage space formed by the tubular side surface portions 601*a* is sealed with the bottom portion 601*b* from one side of the X-axis direction, and is sealed with the top surface portion 620*d* of the nozzle unit 610 from the other side of the X-axis direction. Thus, the storage space in the pouch 601 is hermetically sealed (assuming that the pack-side shutter 603 is closed).

A central portion of the top surface portion 620*d* is provided with an opening, and a receiving port 602*f* of the nozzle 602 coupled with the outer ring member 620 is exposed in the opening. The receiving port 602*f* is an opening that communicates with the discharge port 602*a* via a flow path 602*g* in the nozzle 602. Accordingly, the nozzle unit 610 is configured such that toner in the pouch 601 is received in the flow path 602*g* via the receiving port 602*f* when the toner pack 600 is mounted on the mounting unit 500 of the printer body 100 and the pack-side shutter 603 and the apparatus-side shutter 509 are opened. Toner that has flown into the flow path 602*g* via the receiving port 602*f* is discharged from the discharge port 602*a* as described above, and is replenished into the printer body 100 through the replenishment port 32*a*.

The top surface portion 620*d* (opposed surface) according to the present exemplary embodiment has a planar shape extending substantially vertical to the X-axis direction. However, the shape of the top surface portion 620*d* is not limited to the planar shape. For example, the top surface portion 620*d* (opposed surface) can have a curved surface (cone shape) that is recessed toward the discharge port 602*a* in the X-axis direction as the curved surface approaches the central axis α (FIGS. 17A and 17B and FIGS. 18A and 18F). For example, the top surface portion 620*d* can be formed in a V-shape in which a central portion in the Y-axis direction is recessed toward the discharge port 602*a* in the X-axis direction relative to both end portions thereof when the top surface portion 620*d* (opposed surface) is viewed in the Z-axis direction.

As illustrated in FIGS. 16A to 16D, the cap 630 is formed in a bottomed cylindrical shape and is detachably mounted on the pack-side shutter 603. The outer diameter of the cap 630 is smaller than a maximum outer diameter of the flange portion 603*f* of the pack-side shutter 603. In a state where the cap 630 is mounted, most of the portion (e.g., recessed portion 602*e* and end surfaces 603*g* and 605*a*) where the nozzle 602 and the pack-side shutter 603 interact with the mounting unit 500 of the printer body 100 is hidden by the cap 630. Accordingly, in a state where the cap 630 is mounted, the nozzle unit 610 is protected from damage caused by collision with an object or accidental touching by the user.

As illustrated in FIGS. 16B and 16D, the flange portion 603*f* of the pack-side shutter 603 is provided with a linear portion 603*fa* that is a part of the circumference of the flange portion 603*f* cut out by a straight line. In a state where the pack-side shutter 603 is located in the covering position, the linear portion 603*fa* is substantially parallel to the Y-axis direction. In other words, the shutter according to the present exemplary embodiment includes a linear portion formed into a linear shape in the second direction (Y-axis direction) at a location apart from the shutter axial (central axis α) in the third direction (Z-axis direction). The provision of the linear portion 603*fa* improves the stability when the toner pack 600 is placed on a horizontal plane in an orientation where the X-axis direction is substantially horizontal and the linear portion 603*fa* is located below.

Pouch Manufacturing Method

Figure 19A:
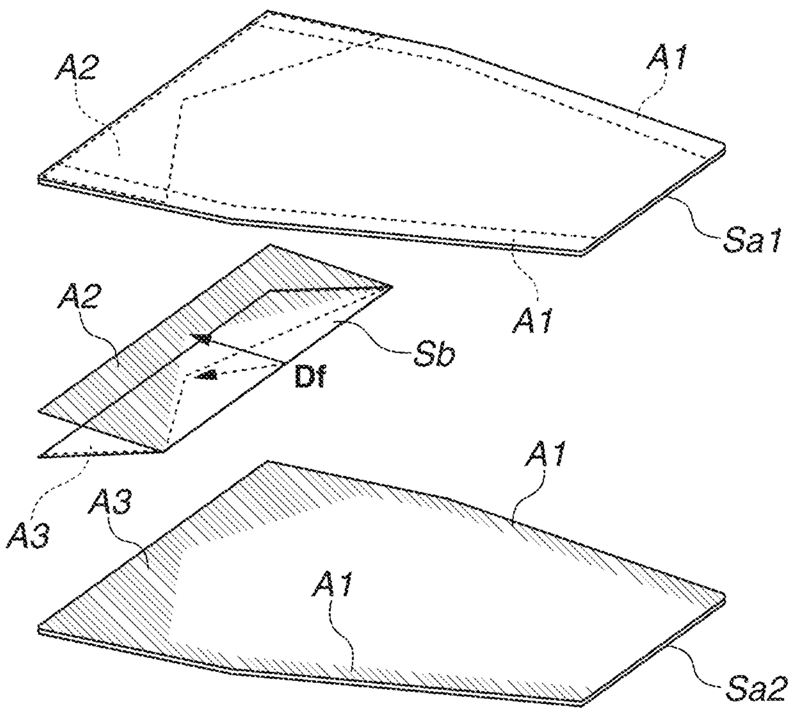
FIGS. 19A and 19B are schematic views each illustrating a toner pack manufacturing method according to the first exemplary embodiment.
Figure 19B:
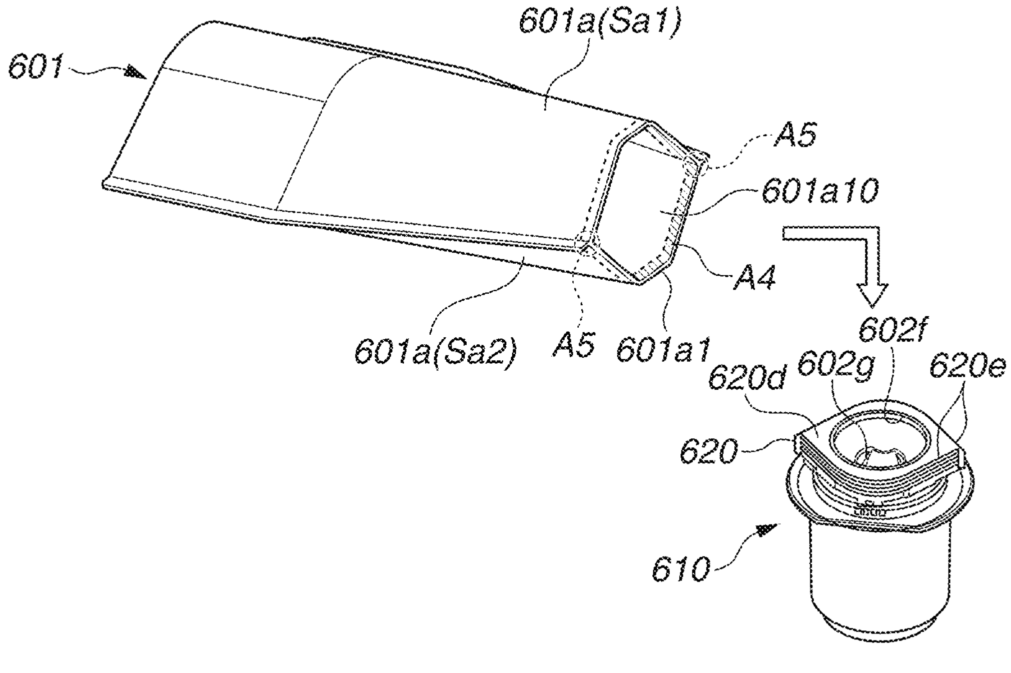

Next, an example of a method for manufacturing the pouch 601 will be described. FIG. 19A schematically illustrates a method for creating the pouch 601 as a bag body using three original sheets Sa1, Sa2, and Sb. FIG. 19B illustrates a method for coupling the pouch 601 with the nozzle unit 610.

As illustrated in FIG. 19A, first, the original sheet Sb serving as the bottom portion 601*b* of the pouch 601 is sandwiched between the two original sheets Sa1 and Sa2 serving as the side surface portions 601*a* of the pouch 601 in a state where the original sheet Sb is folded into two. In this state, the original sheets Sa1 and Sa2 are welded in areas A1 of side edge portions. The original sheets Sa1 and Sb are welded in an area A2 and the original sheets Sa2 and Sb are welded in an area A3, thereby forming the bag-like (bottomed tubular shape) pouch 601.

In an actual pouch manufacturing apparatus, original sheets continuously fed from a web roll in a flow direction are sequentially welded to form the bag structure of the pouch 601 and are cut out at positions between adjacent pouches 601 to form individual pouches 601. In this case, the cutting is performed at the positions corresponding to the end edges in the Y-axis direction of the illustrated original sheets Sa1, Sa2, and Sb. Thus, the pouch 601 illustrated in FIG. 19B and the like can be obtained.

The method for creating the bag-like (bottomed tubular shape) pouch 601 using one or more film members (original sheets) is not limited to the above-described method. For example, a sheet for side gusset can be interposed between the original sheets Sa1 and Sa2.

When the original sheets Sa1, Sa2, and Sb are welded in the areas A2 and A3 illustrated in FIG. 19A, the bottom portion 601*b* of the pouch 601 corresponds to a mountain-shaped surface with a central portion in the Y-axis direction protruding as illustrated in FIGS. 16A to 16C. However, the shape of the bottom portion 601*b* is not limited to this example, and the shape of the bottom portion 601*b* can be changed by changing the shape and the layout of the areas A2 and A3 where the side surface portions 601*a* and the bottom portion 601*b* are welded. For example, on the original sheet Sb that forms the bottom portion 601*b* of the pouch 601, a direction that is perpendicular to the fold line and ranges from the area A1 to be welded with the other original sheet Sa1 to the area A3 to be welded with the other original sheet Sa2 is defined as a direction Df. The size of the bottom portion 601*b* of the pouch 601 in the Z-axis direction increases as the distance measured along the direction Df increases, within the size permitted by the original sheets Sa1 and Sa2. That is, the shape of the manufactured pouch 601 can be controlled by changing the areas A1 to A3 where the original sheets Sa1, Sa2, and Sb are welded when the pouch 601 is manufactured.

As illustrated in FIG. 19B, in the pouch 601 that is formed in a bag-like shape (bottomed tubular shape) that is open toward the opposite side of the bottom portion 601*b* in the X-axis direction, the opening edge 601*a*1 of each side surface portion 601*a* is coupled with the outer ring member 620 of the nozzle unit 610. In other words, the nozzle unit 610 serving as the discharge member is coupled with the opening side of the pouch 601 serving as the bag body. The outer ring member 620 has a coupling surface 620*e* (mounting surface) with a shape in which the circumference of the top surface portion 620*d* as viewed in the X-axis direction extends in the X-axis direction. The opening edge 601*a*1 of the pouch 601 is coupled with the coupling surface 620*e* by using a hot melt adhesive, welding, or the like, thereby integrally forming the pouch 601 with the nozzle unit 610.

The coupling surface 620*e* is a coupling portion (connecting portion) of the nozzle unit 610 configured to prevent toner leakage by being coupled with the pouch 601 (bag body) all around the top surface portion 620*d* serving as the opposed surface. As described above, after the pouch 601 is filled with toner through the opening of the outer ring member 620 in a state where the pouch 601 is coupled with the outer ring member 620, the leading edge portion such as the nozzle 602 can be attached to the outer ring member 620.

Layout of Individual Information

Next, individual information provided on the toner pack 600 will be described with reference to FIG. 1 and FIGS. 20 to 22. The toner pack 600 according to the present exemplary embodiment is provided with a two-dimensional code 6011 as individual information. Specifically, the two-dimensional code 6011 is a quick response (QR) code®. The user can check an operation method for replenishing toner from the toner pack 600, information about the toner pack body, or the like by scanning the two-dimensional code 6011.

Accordingly, it may be desirable for the user to easily scan the two-dimensional code 6011 with a scanning device.

Any one of the components that constitute the outer surface of the toner pack 600 and can be seen by the user during the operation of taking out a product from a box and replenishing toner may be desirable as a location where the user can easily scan the two-dimensional code 6011.

In the present exemplary embodiment, specific examples of the location where the two-dimensional code 6011 can be easily scanned include the pouch 601, the cap 630, the pack-side shutter 603, and the nozzle 602. Among these components, the pouch 601 has flexibility as described above.

The term "flexibility" defined in the present exemplary embodiment refers to flexibility of a degree that allows the user to easily deform and reduce the volume of the pouch 601 by kneading the pouch 601 with user's hands in a state where the discharge port 602*a* is open, thereby facilitating toner discharge as described above. When the two-dimensional code 6011 is located on the pouch 601 having flexibility, deformations such as irregularities or wrinkles occur on the two-dimensional code 6011 depending on the distribution of the product or user's operation, which can make it difficult to scan individual information.

Heretofore, such concerns have been dealt with to some extent, for example, by locating the two-dimensional code 6011 on a certain area of the pouch 601 where irregularities, wrinkles, and the like are less likely to occur, or by adjusting the size of the two-dimensional code 6011. However, the status of occurrence of irregularities, wrinkles, or the like changes accordingly, and thus there is a concern that the two-dimensional code 6011 cannot be easily scanned depending on the situation.

On the other hand, in the configuration according to the present exemplary embodiment, the nozzle unit 610 including the cap 630, the pack-side shutter 603, and the nozzle 602 is composed of components with higher rigidity than that of the pouch 601. This configuration will be described in detail.

The pouch 601 is extended and formed after extrusion molding using polyethylene or polypropylene. The pouch 601 can be a film member with a thickness in a range from 25 μm to 300 μm. The thickness of the film member may be preferably in a range from 50 μm to 150 μm from the viewpoint of discharge properties as to whether toner can be favorably discharged from the toner pack 600 when the user replenishes toner by pushing the pouch 601 with user's hands. In the present exemplary embodiment, the film member has a thickness of 110 μm.

The components constituting the nozzle unit 610 are made of polypropylene and are subjected to injection molding using a mold. The thickness of the portion where the two-dimensional code 6011 is provided can be in a range from 0.8 mm to 3 mm. The thickness of the portion where the two-dimensional code 6011 is provided may be preferably in a range from 1 mm to 2 mm from the viewpoint of moldability, cost, and accuracy.

The portion where at least the two-dimensional code 6011 is provided has higher rigidity than the pouch 601 and has difference in rigidity due to the thickness, manufacturing method, and the like used. Thus, irregularities, wrinkles, and the like are less likely to occur in the nozzle unit 610 compared with the pouch 601. This enables the user to successfully scan the two-dimensional code 6011 when the two-dimensional code 6011 is scanned with a scanning device.

When the components constituting the nozzle unit 610 are made of polypropylene and the pouch 601 is made of polyethylene or polypropylene, the Young's modulus of the material of components constituting the nozzle unit 610 may be preferably greater than or equal to the Young's modulus of the components constituting the pouch 601.

The term "high rigidity" as used herein refers to hardness sufficient enough to prevent the surface of each member from being easily and greatly deformed by a force of kneading the pouch 601 having flexibility as described above with user's hands holding the pouch 601. Even when an external force by the user acts, irregularities, wrinkles, and the like are less likely to occur in the nozzle unit 610, unlike the pouch 601, which is a film member. In other words, the shape of each of the portions constituting the nozzle unit 610 or the location where the two-dimensional code 6011 is provided is not changed from the factory default state.

Thus, the two-dimensional code 6011 is provided on the cap 630, the pack-side shutter 603, or the nozzle 602, which has higher rigidity than that of the pouch 601, thereby making it possible to stably scan the two-dimensional code 6011 with a scanning device each time. Consequently, scanning stability can be expected. Therefore, it can be expected to obtain the advantageous effect that the user can stably and successfully access a uniform resource locator (URL) or individual information indicated by the two-dimensional code 6011 after the two-dimensional code 6011 is scanned with a scanning device.

Figure 20:
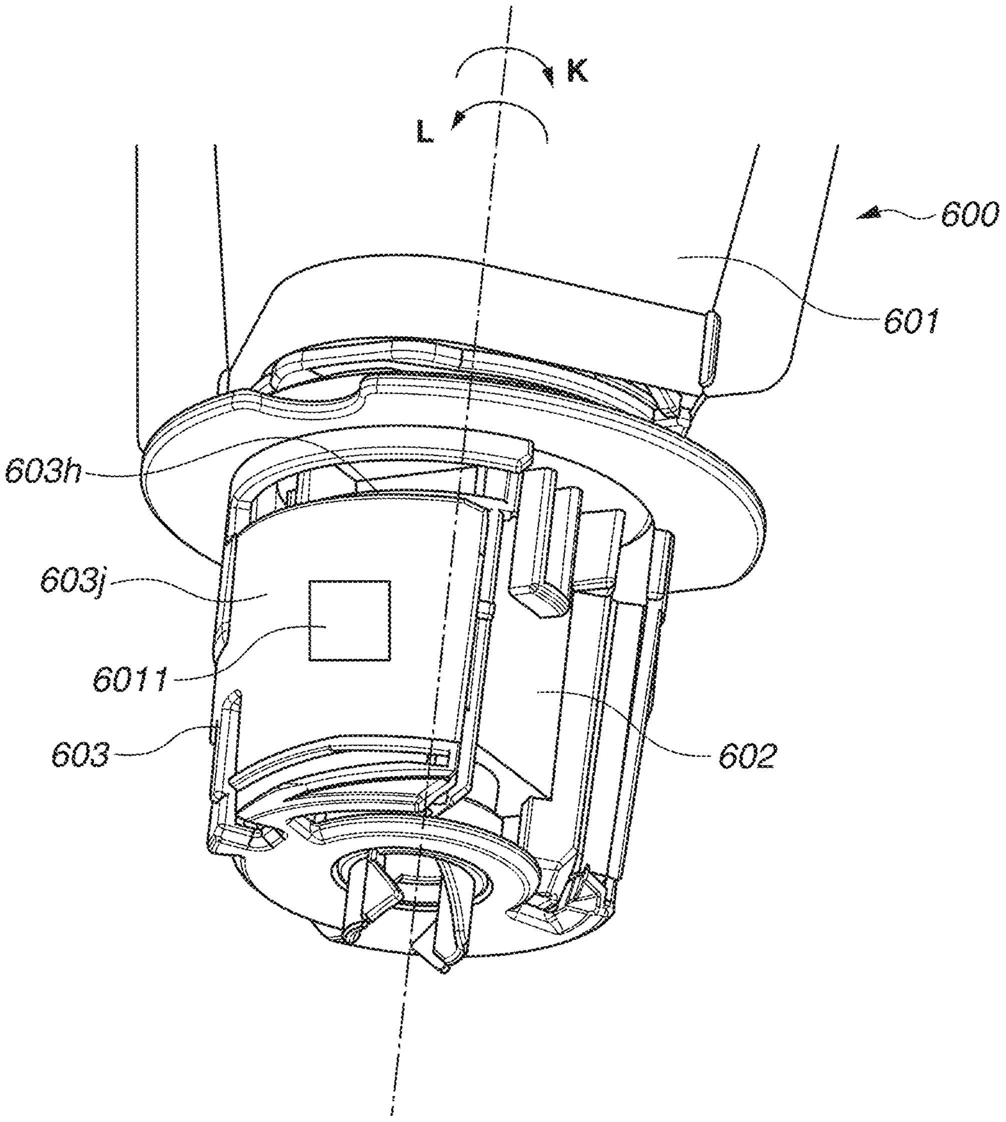
FIG. 20 illustrates a layout example of individual information on a pack-side shutter according to the first exemplary embodiment.
Figure 21:
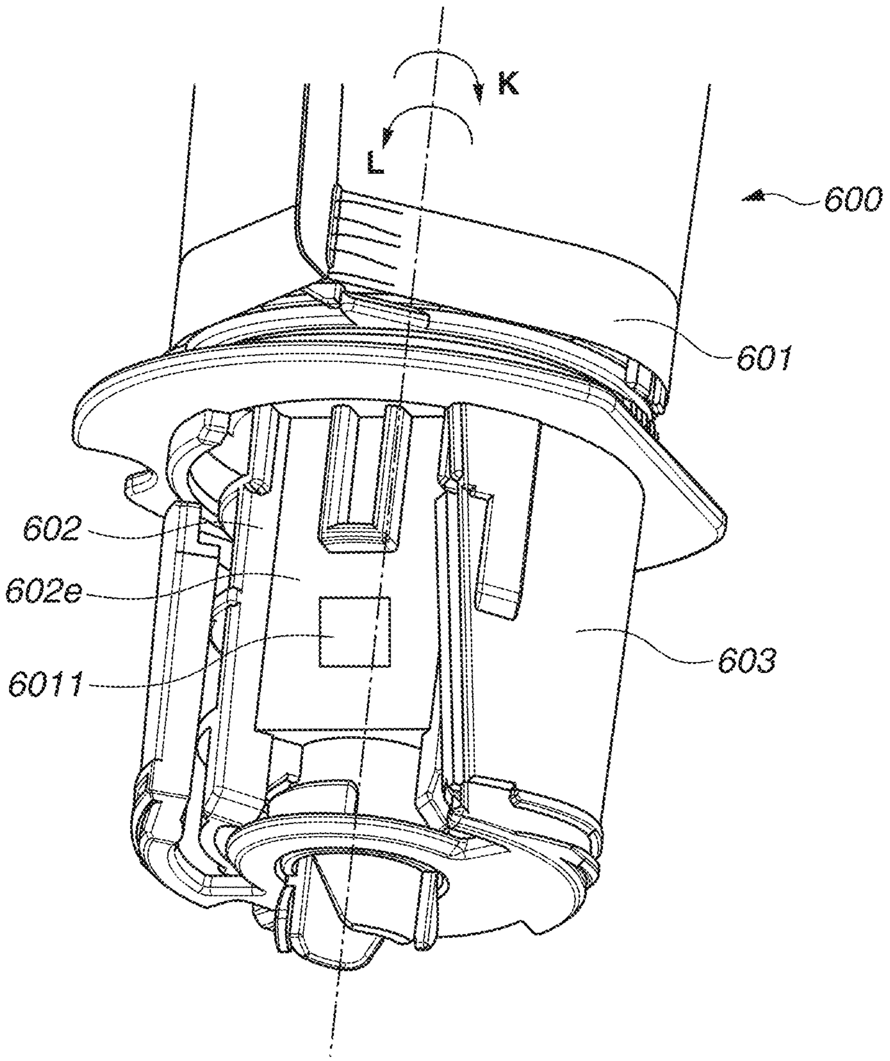
FIG. 21 illustrates a layout example of individual information on the nozzle according to the first exemplary embodiment.

A layout example of the two-dimensional code 6011 on each of the cap 630, the pack-side shutter 603, and the nozzle 602 will be described below. As examples of the location where the two-dimensional code 6011 is provided, FIG. 1 illustrates an example where the two-dimensional code 6011 is provided on the cap 630, FIG. 20 illustrates an example where the two-dimensional code 6011 is provided on the pack-side shutter 603, and FIG. 21 illustrates an example where the two-dimensional code 6011 is provided on the nozzle 602.

Figure 1:
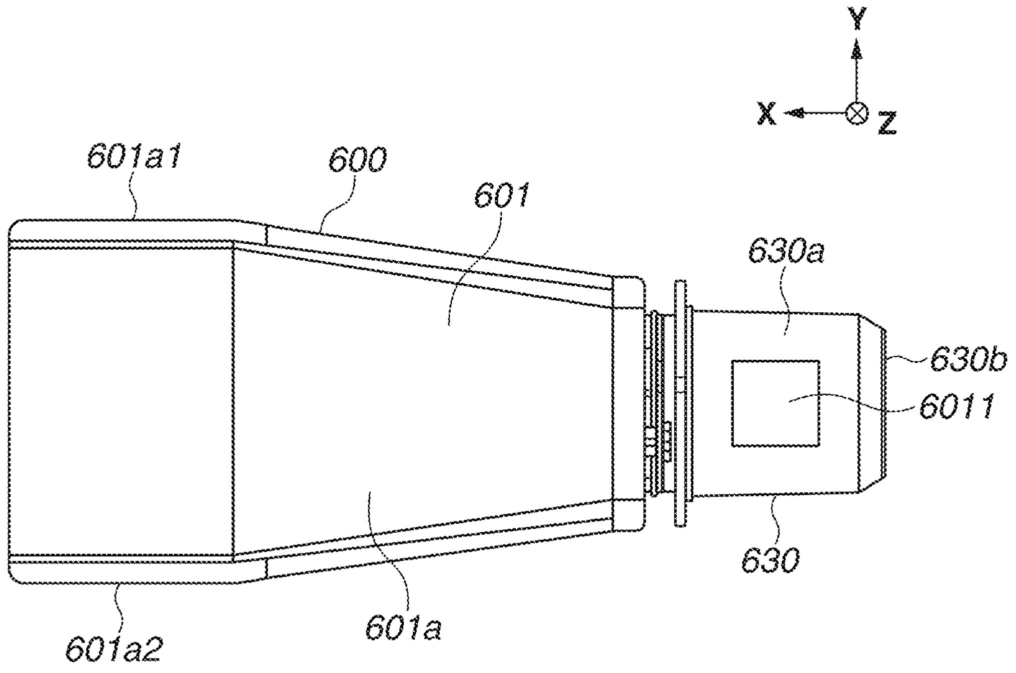
FIG. 1 illustrates a layout example of individual information on a cap according to a first exemplary embodiment.

In the toner pack 600 illustrated in FIG. 1, the two-dimensional code 6011 is provided on a part of a cap outer surface 630*a* of the cap 630.

The cap 630 has a cylindrical surface having a central axis along a direction in which the pouch 601 and the nozzle 602, which is a part of the leading edge portion, are aligned, and the two-dimensional code 6011 is provided on the cylindrical surface.

Figure 22:
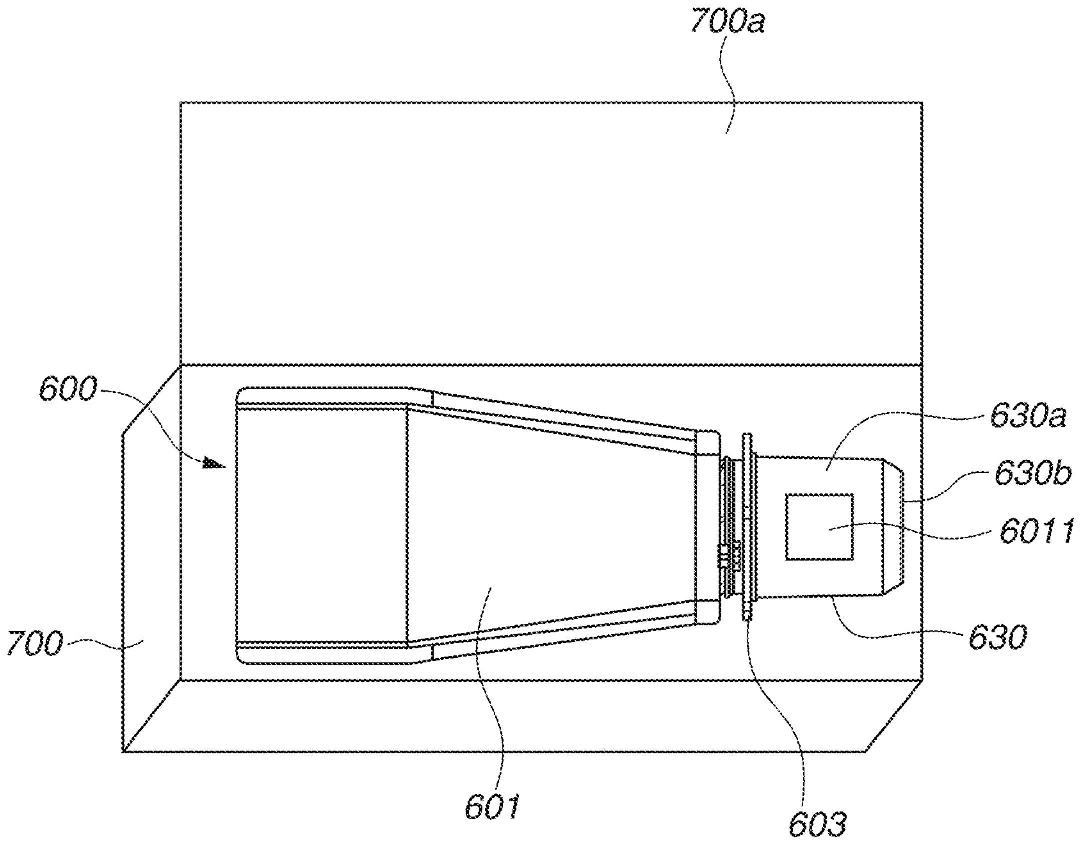
FIG. 22 illustrates a state where a packaging material for the toner pack according to the first exemplary embodiment is opened.

The cap 630 is a component to be removed from the toner pack 600 before the user replenishes toner, and the cap outer surface 630*a* corresponds to a location to be gripped by the user when the cap 630 is removed, so that the user can easily recognize the location. Accordingly, if the two-dimensional code 6011 is provided at a position where a flap 700*a* that opens when a container box 700 of the toner pack 600 illustrated in FIG. 22 is opened faces the line of sight of the user in an unopened state, the visual recognition can be improved, which is more effective. In the state illustrated in FIG. 22, the two-dimensional code 6011 can be scanned immediately in a state where the container box 700 is opened.

As illustrated in FIG. 22, the toner pack 600 is provided to the user in a state where the toner pack 600 is contained in the container box 700, and the user opens the container box 700 by opening one of the surfaces of the container box 700. When the container box 700 is opened, the toner pack 600 is located in the container box 700 such that the toner pack 600 can be seen from a Z-direction on a coordinate system illustrated in FIGS. 18A to 18F. When the toner pack 600 is located in this manner, the user can visually recognize the two-dimensional code 6011 located on the cap outer surface 630*a* immediately after the container box 700 is opened. Specifically, the two-dimensional code 6011 is provided as illustrated in FIGS. 16B and 16C. FIGS. 16B, 16C, and 16D each illustrate a state where the two-dimensional code 6011 is also located on a bottom portion 630*b* of the cap 630, i.e., the bottom surface thereof as described below. Thus, a plurality of two-dimensional codes 6011 can be provided.

The two-dimensional code 6011 need not necessarily be located on the side opposite to the side that can be viewed from the user in the line-of-sight direction of the user. The two-dimensional code 6011 can also be located on any other location.

As another example of the location where the two-dimensional code 6011 is provided, the two-dimensional code 6011 can be provided on the bottom portion 630*b* of the cap 630 as illustrated in FIG. 22. In this case, when the container box 700 is opened, the two-dimensional code 6011 is not directed in the line-of-sight direction of the user, which makes it difficult for the user to see the two-dimensional code 6011. However, assume that the user holds the toner pack 600 with the user's hand in a state where the discharge port 602*a* of the toner pack 600 is located at the upper side after the user has taken out the toner pack 600 from the container box 700. In this case, the bottom portion 630*b* of the cap 630 faces upward, which enables the user to easily recognize the two-dimensional code 6011. Since the bottom portion 630*b* of the toner pack 600 is a flat surface, it can be expected to further improve the scanning performance for the two-dimensional code 6011.

The toner pack 600 illustrated in FIG. 20 is in a state after the cap 603 is removed as a pre-stage of replenishing toner by the user. In this case, the two-dimensional code 6011 is provided on an outer surface 603*j* located below the groove portion 603*h* of the pack-side shutter 603. In this case, when the user mounts the toner pack 600 on the printer body 100 to replenish toner, the two-dimensional code 6011 faces the user in this process. This enables the user to more easily recognize the location of individual information.

Like FIG. 20, FIG. 21 also illustrates a state where the cap 630 is removed from the toner pack 600.

In this case, the two-dimensional code 6011 is located within the range of the recessed portion 602*e* that is a part of the outer surface of the nozzle 602 and is exposed from the pack-side shutter 603. During toner replenishing, the user mounts the toner pack 600 by aligning the recessed portion 602*e* of the nozzle 602, the opening 603*a* of the pack-side shutter 603, and the positioning portion 507*a* of the first frame 507. In this case, if the two-dimensional code 6011 is located on the recessed portion 602*e*, the user can easily recognize the two-dimensional code 6011. This is because the user mounts the toner pack 600 while gazing at the recessed portion 602*e* provided with the two-dimensional code 6011 and the opening 603*a* of the pack-side shutter 603. The recessed portion 602*e* also functioning as a positioning portion with the first frame 507 has a flat surface, and thus it can be expected to further improve the scanning performance. Thus, the two-dimensional code 6011 is located on the flat surface of the recessed portion 602*e*. The recessed portion 602*e* is exposed to the outside when the pack-side shutter 603 covers the discharge port 602*a*, and is covered with the pack-side shutter 603 when the pack-side shutter 603 is located at a position where the discharge port 602*a* is exposed. The two-dimensional code 6011 need not necessarily be located on the flat surface, as long as sufficient rigidity can be ensured, and can be located on a cylindrical surface. In the present exemplary embodiment, the recessed portion 602*e* also functions as the positioning portion, and thus the flat surface is used.

As a method for locating the two-dimensional code 6011, a sticker on which the two-dimensional code 6011 is printed can be attached to the above-described position. Alternatively, laser imprinting, inkjet printing, or the like can be used.

Examples of information provided via the two-dimensional code can include individual information, such as a model, a product name, and a production number, with which individual products can be identified, and information about a URL. The user can scan a two-dimensional code using a smartphone or the like so that the user can access a web site for an operation manual from the URL. Alternatively, information other than individual information and information about a URL can be used.

The two-dimensional code 6011 can be provided on two or more locations. First information can be individual information and second information can be information about a URL to access a web site for a manual. One two-dimensional code can be located on the cap 630, another two-dimensional code can be located on the pack-side shutter 603, and yet another two-dimensional code can be located on the nozzle 602. The two-dimensional codes can be different two-dimensional codes, respectively. This configuration enables easy scanning of various information and easy attachment of two-dimensional codes to the toner pack 600.

Other Exemplary Embodiments

While the exemplary embodiments described above illustrate an example where a two-dimensional code is used as individual information, a non-contact integrated circuit (IC) tag such as radio-frequency identification (RFID) can be used as individual information. Placing a tag in any of the cap 630, the pack-side shutter 603, and the nozzle 602, which are not easily deformed, prevents damage to the tag by the distribution of the product, user operation, or the like.

The size of the RFID is about the same as the size of the two-dimensional code 6011, and the RFID can be located at the same position as the two-dimensional code 6011 described above. The RFID is in the form of a sticker on which an adhesive is entirely applied. After the RFID is attached, the two-dimensional code in the form of a sticker can be attached onto the surface of the RFID, or the two-dimensional code can be printed on the surface of the RFID. Each position of the two-dimensional code 6011 described above with reference to the drawings can also be superimposed as the position of the RFID.

The surface of the RFID need not necessarily be exposed to the outside, unlike the two-dimensional code 6011. The RFID and the two-dimensional code 6011 can be located in a superimposed manner as viewed in a direction vertical to the surface of the two-dimensional code 6011 by, for example, further superimposing and attaching a sticker for the two-dimensional code at the same position after the RFID is attached to the surface. The RFID and the two-dimensional code 6011 are attached and located in a superimposed manner, thereby making it possible to effectively use the limited area on the surface of the nozzle unit 610.

In addition to the above-described configurations, as illustrated in FIG. 17A, the two-dimensional code 6011 or the RFID can be located on the disc-shaped flange portion 603*f* of the pack-side shutter 603 of the nozzle unit 610.

As described above, individual information or the like is provided on the cap 630, the pack-side shutter 603, the nozzle 602, or the like with higher rigidity relative to the pouch 601, thereby making it possible to further stabilize and enhance the scanning performance by a scanning device.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-146697, filed Sep. 11, 2023, which is hereby incorporated by reference herein in its entirety.

What is claimed is:

1. A toner container comprising:

a bag, including an opening and formed of resin film, configured to store toner; and a leading edge portion mounted on the opening of the bag, the leading edge portion including a nozzle provided with a discharge port to discharge the toner stored in the bag external to the toner container, wherein the leading edge portion includes a portion formed of resin and provided with a two-dimensional code, and wherein the portion has a thickness greater than a thickness of the resin film.

2. The toner container according to claim 1, wherein the thickness of the resin film is in a range from 25 μm to 300 μm, and wherein the thickness of the portion is in a range from 0.8 mm to 3 mm.

3. The toner container according to claim 1, wherein a Young's modulus of a material forming the portion is greater than or equal to a Young's modulus of a material forming the resin film.

4. The toner container according to claim 1, wherein the portion is a part of the nozzle.

5. The toner container according to claim 4, wherein the nozzle includes a cylindrical surface having a central axis along a direction in which the bag and the leading edge portion are aligned, and wherein the portion is a part of the cylindrical surface.

6. The toner container according to claim 5, wherein the portion corresponds to a flat surface portion of the cylindrical surface.

7. The toner container according to claim 1, wherein the leading edge portion further includes a shutter configured to be movable, and wherein the portion is a part of the shutter.

8. The toner container according to claim 7, wherein the shutter includes a cylindrical surface having a central axis along a direction in which the bag and the leading edge portion are aligned, and wherein the portion is a part of the cylindrical surface.

9. The toner container according to claim 8, wherein a portion of the cylindrical surface different from the portion is provided with a discharge port.

10. The toner container according to claim 1, wherein the leading edge portion further includes a cap configured to be detachably mounted on the nozzle and cover a circumference of the nozzle, and wherein the portion is a part of the cap.

11. The toner container according to claim 10, wherein a portion of the cylindrical surface different from the portion is provided with a discharge port.

12. The toner container according to claim 10, wherein the cap includes a cylindrical surface having a central axis along a direction in which the bag and the leading edge portion are aligned, and wherein the portion is a part of the cylindrical surface.

13. The toner container according to claim 10, wherein the cap includes a cylindrical surface and a bottom surface, the cylindrical surface having a central axis along a direction in which the bag and the leading edge portion are aligned, the bottom surface intersecting the central axis, and wherein the portion is a part of the bottom surface on an outside of the cap.

14. The toner container according to claim 1, wherein the discharge port is provided to face a direction intersecting a direction in which the bag and the leading edge portion are aligned, wherein the leading edge portion further includes a shutter configured to be movable, wherein the shutter is configured to be movable to a covering position and an uncovering position relative to the nozzle, the covering position being a position where the discharge port is covered and the uncovering position being a position where the discharge port is uncovered, wherein the portion is covered with the shutter when the shutter is in the uncovering position, and wherein the portion is a portion of the nozzle to be exposed external to the toner container in a case where the shutter is in the covering position.

15. The toner container according to claim 1, wherein the leading edge portion further includes a cap configured to be detachably mounted on the nozzle and cover a circumference of the nozzle, and wherein the portion corresponds to a portion of the cap provided with the two-dimensional code and a portion of the nozzle provided with the two-dimensional code.

16. The toner container according to claim 15, wherein, in a case where the two-dimensional code provided on the cap is a first two-dimensional code and the two-dimensional code provided on the nozzle is a second two-dimensional code, wherein either the first two-dimensional code or the second two-dimensional code is information including a uniform resource locator (URL), and the other of the first two-dimensional code or the second two-dimensional code is individual information about the toner container.

17. The toner container according to claim 1, wherein the leading edge portion further includes:

a cap configured to be detachably mounted on the nozzle and cover a circumference of the nozzle; and a shutter configured to be movable, wherein the portion corresponds to a portion of the cap provided with the two-dimensional code and a portion of the shutter provided with the two-dimensional code.

18. The toner container according to claim 17, wherein, in a case where the two-dimensional code provided on the cap is a first two-dimensional code and the two-dimensional code provided on the shutter is a second two-dimensional code, wherein either the first two-dimensional code or the second two-dimensional code is information including a uniform resource locator (URL), and the other of the first two-dimensional code or the second two-dimensional code is individual information about the toner container.

19. The toner container according to claim 1, wherein the leading edge portion further includes a shutter configured to be movable, and wherein the portion corresponds to a portion of the shutter provided with the two-dimensional code and a portion of the nozzle provided with the two-dimensional code.

20. The toner container according to claim 19, wherein, in a case where the two-dimensional code provided on the nozzle is a first two-dimensional code and the two-dimensional code provided on the shutter is a second two-dimensional code, wherein either the first two-dimensional code or the second two-dimensional code is information including a uniform resource locator (URL), and the other of the first two-dimensional code or the second two-dimensional code is individual information about the toner container.

21. The toner container according to claim 1, wherein the leading edge portion includes a portion that is configured to receive a removable sticker including the two-dimensional code.

22. The toner container according to claim 1, wherein the leading edge includes a portion that is configured to receive a non-contact integrated circuit tag, and wherein the non-contact integrated circuit tag and the two-dimensional code are provided in a superimposed manner and bonded together.

23. The toner container according to claim 1, wherein the resin film is a film formed by extrusion molding and is extended, and wherein the portion is made of resin formed by injection molding.

24. The toner container according to claim 1, wherein the resin film has a thickness in a range from 50 μm to 150 μm, and wherein the thickness of the portion is in a range from 1 mm to 2 mm.

* * * * *